US012644247B2

(12) United States Patent
Von Deylen

(10) Patent No.: US 12,644,247 B2
(45) Date of Patent: Jun. 2, 2026

(54) MULTIPART GROUND SCREW COLLAR DEVICE, ASSEMBLY, SYSTEM, AND METHOD

(71) Applicant: APA SOLAR, LLC, Ridgeville Corners, OH (US)

(72) Inventor: Joshua David Von Deylen, Bryan, OH (US)

(73) Assignee: APA SOLAR, LLC, Ridgeville Corners, OH (US)

( * ) Notice: Subject to any disclaimer, the term of this patent is extended or adjusted under 35 U.S.C. 154(b) by 396 days.

(21) Appl. No.: 18/502,731

(22) Filed: Nov. 6, 2023

(65) Prior Publication Data

US 2024/0150988 A1 May 9, 2024

Related U.S. Application Data

(60) Provisional application No. 63/422,783, filed on Nov. 4, 2022.

(51) Int. Cl.

| | |
|---|---|
| *E02D 5/80* | (2006.01) |
| *F16B 7/18* | (2006.01) |
| *F16B 17/00* | (2006.01) |
| *F16M 11/22* | (2006.01) |
| *H02S 20/10* | (2014.01) |
| *H02S 30/00* | (2014.01) |
| *E04H 12/34* | (2006.01) |

(52) U.S. Cl.
CPC .............. *E02D 5/801* (2013.01); *F16B 7/182* (2013.01); *F16B 17/004* (2013.01); *F16M 11/22* (2013.01); *H02S 20/10* (2014.12); *H02S*

*30/00* (2013.01); *E02D 2600/20* (2013.01); *E04H 12/347* (2013.01); *F16B 2200/99* (2023.08)

(58) Field of Classification Search
CPC ..... E02D 5/801; E02D 2600/20; F16B 7/182; F16B 17/004; F16B 2200/99; F16M 11/22; H02S 20/10; H02S 30/00; E04H 12/347
See application file for complete search history.

(56) References Cited

U.S. PATENT DOCUMENTS

| | | | | |
|---|---|---|---|---|
| 11,454,423 | B1 * | 9/2022 | Huzyak ................... | F24S 25/12 |
| 12,152,400 | B2 * | 11/2024 | Von Deylen .......... | E04H 12/347 |
| 2013/0256246 | A1 * | 10/2013 | Tagliamonte ........... | H02S 20/00 |
| | | | | 211/41.1 |
| 2014/0252195 | A1 * | 9/2014 | Maresca ................. | F24S 25/12 |
| | | | | 248/371 |

* cited by examiner

*Primary Examiner* — Ryan J. Walters
(74) *Attorney, Agent, or Firm* — Jacob M. Ward; Ward Law Office LLC

(57) ABSTRACT

The present disclosure relates to a collar device for a multi-part ground screw assembly. A ground screw device and an installed racking system are also both provided. A method of installing the racking system is provided as well. The collar device includes an annular main body with at least one aperture having a hexagonal shape. The collar device further includes at least one fastener assembly, comprising a fastener with a head and a threaded post, a locking washer, and a hexnut washer. The collar device is coupled to the ground screw device and the racking device. Advantageously, the collar device is easy to transport for on-site installation of a solar racking system and provides an efficient system capable of easily removing the collar device from the solar racking system as well.

20 Claims, 17 Drawing Sheets

300

302

308

308

310

310

304

304

306

306

100

100

202

202

216

216'

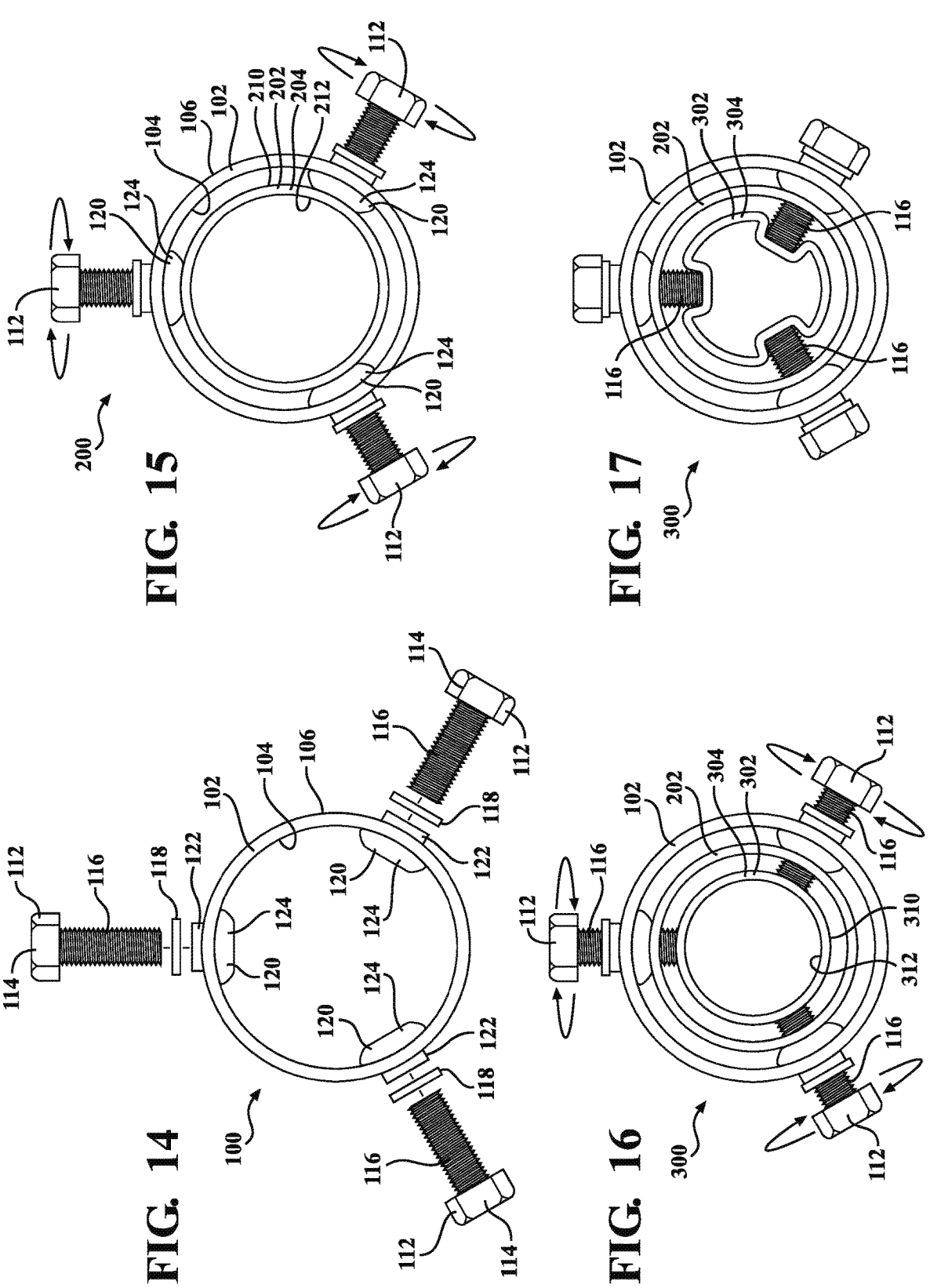

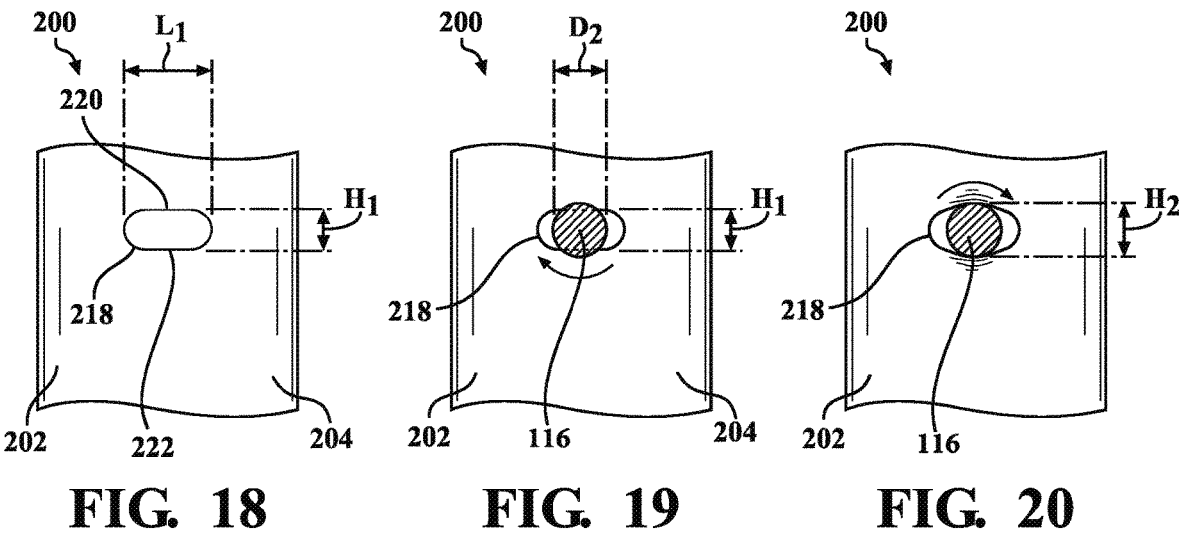
FIG. 18     FIG. 19     FIG. 20
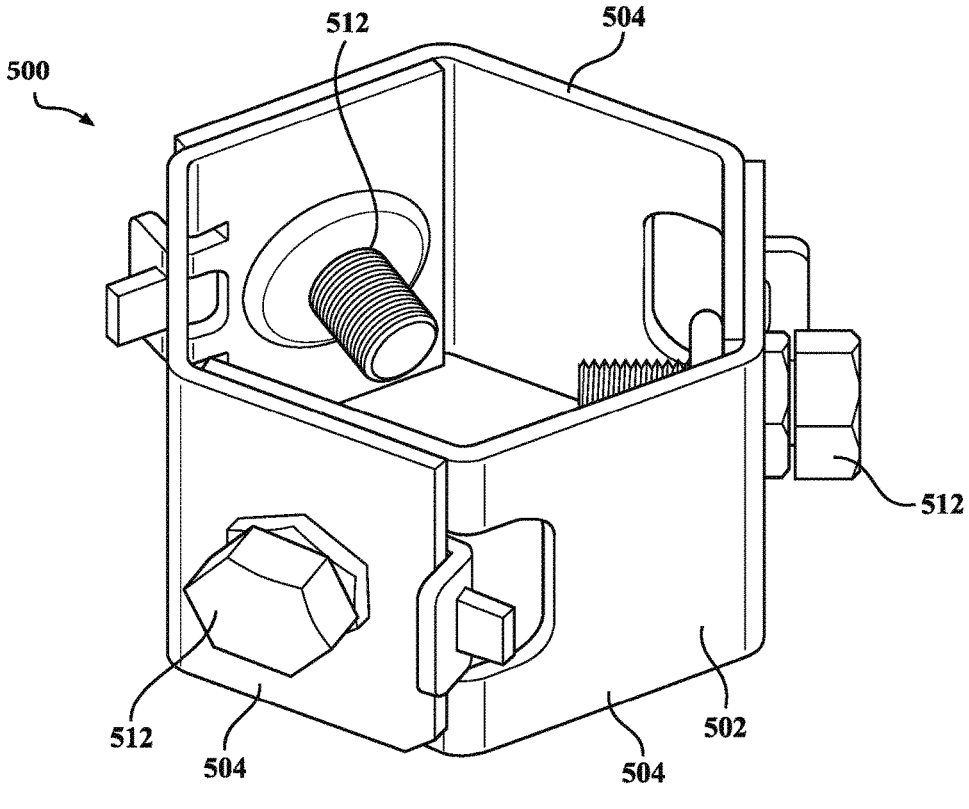
FIG. 21

FIG. 23                            FIG. 24

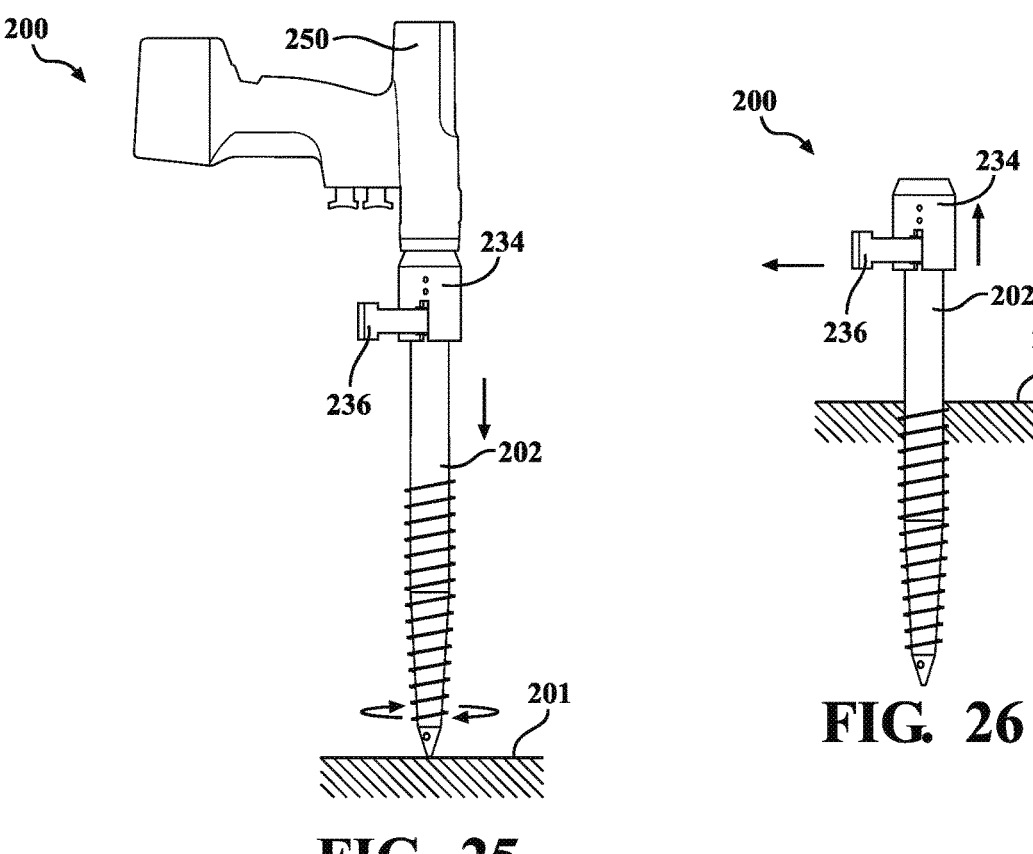
FIG. 25
FIG. 26
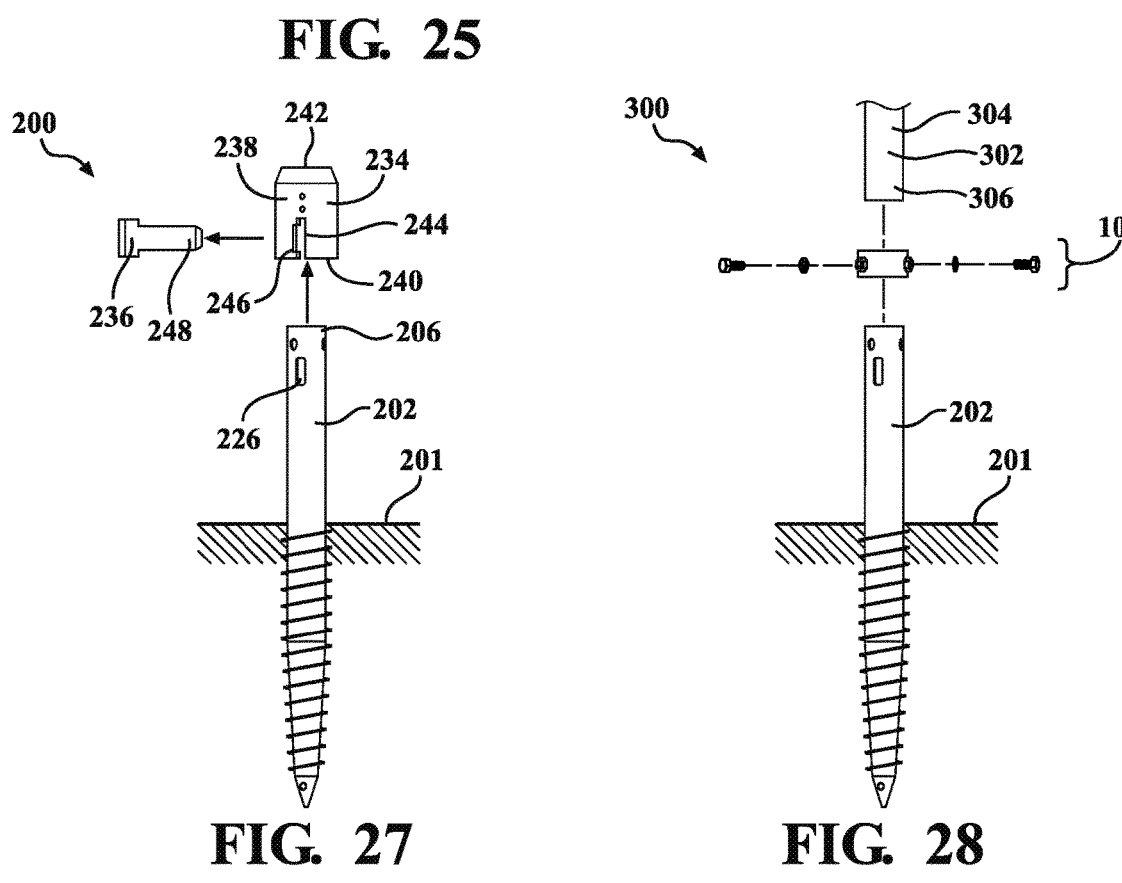
FIG. 27
FIG. 28

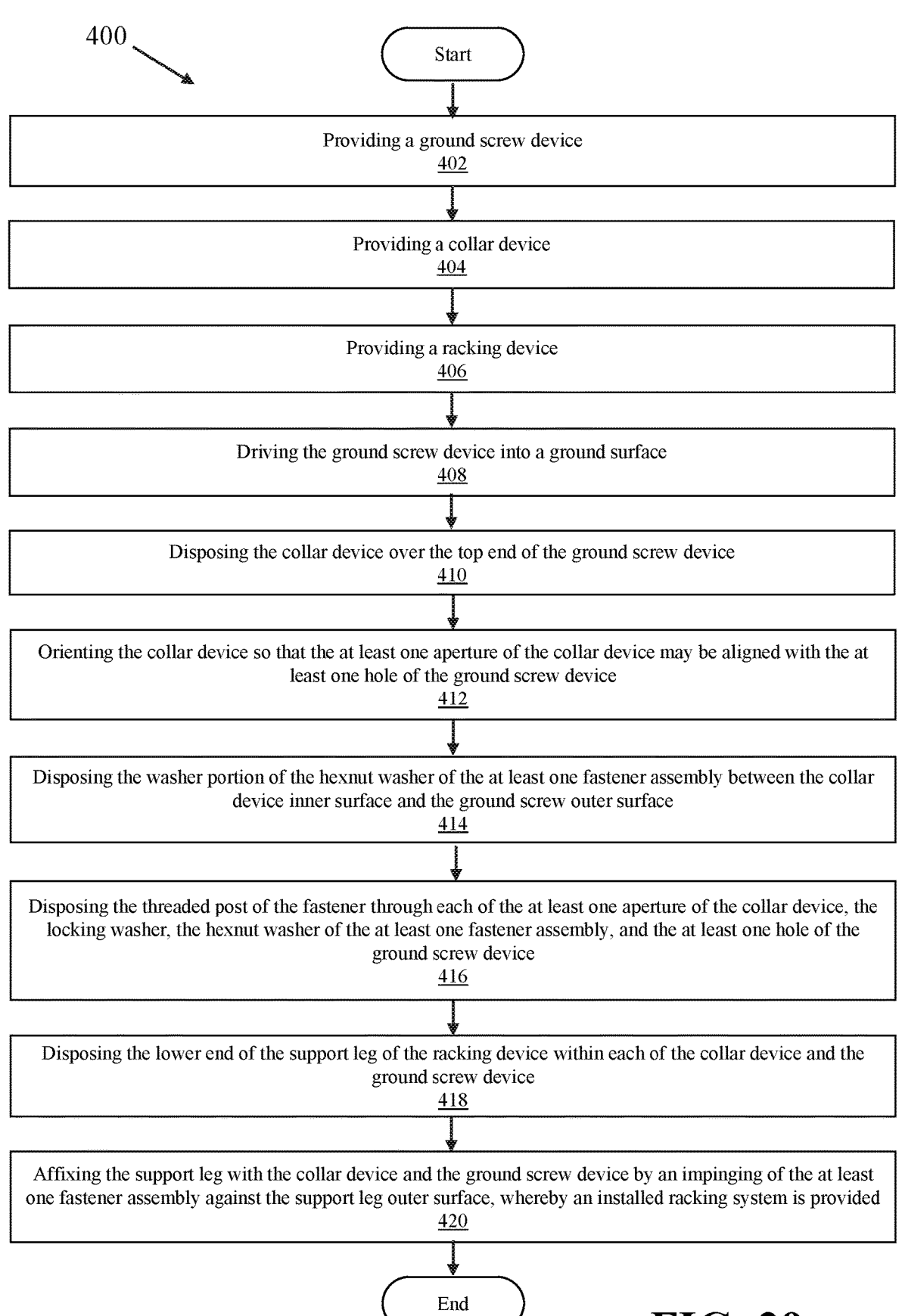

400

Start

Providing a ground screw device
402

Providing a collar device
404

Providing a racking device
406

Driving the ground screw device into a ground surface
408

Disposing the collar device over the top end of the ground screw device
410

Orienting the collar device so that the at least one aperture of the collar device may be aligned with the at least one hole of the ground screw device
412

Disposing the washer portion of the hexnut washer of the at least one fastener assembly between the collar device inner surface and the ground screw outer surface
414

Disposing the threaded post of the fastener through each of the at least one aperture of the collar device, the locking washer, the hexnut washer of the at least one fastener assembly, and the at least one hole of the ground screw device
416

Disposing the lower end of the support leg of the racking device within each of the collar device and the ground screw device
418

Affixing the support leg with the collar device and the ground screw device by an impinging of the at least one fastener assembly against the support leg outer surface, whereby an installed racking system is provided
420

End

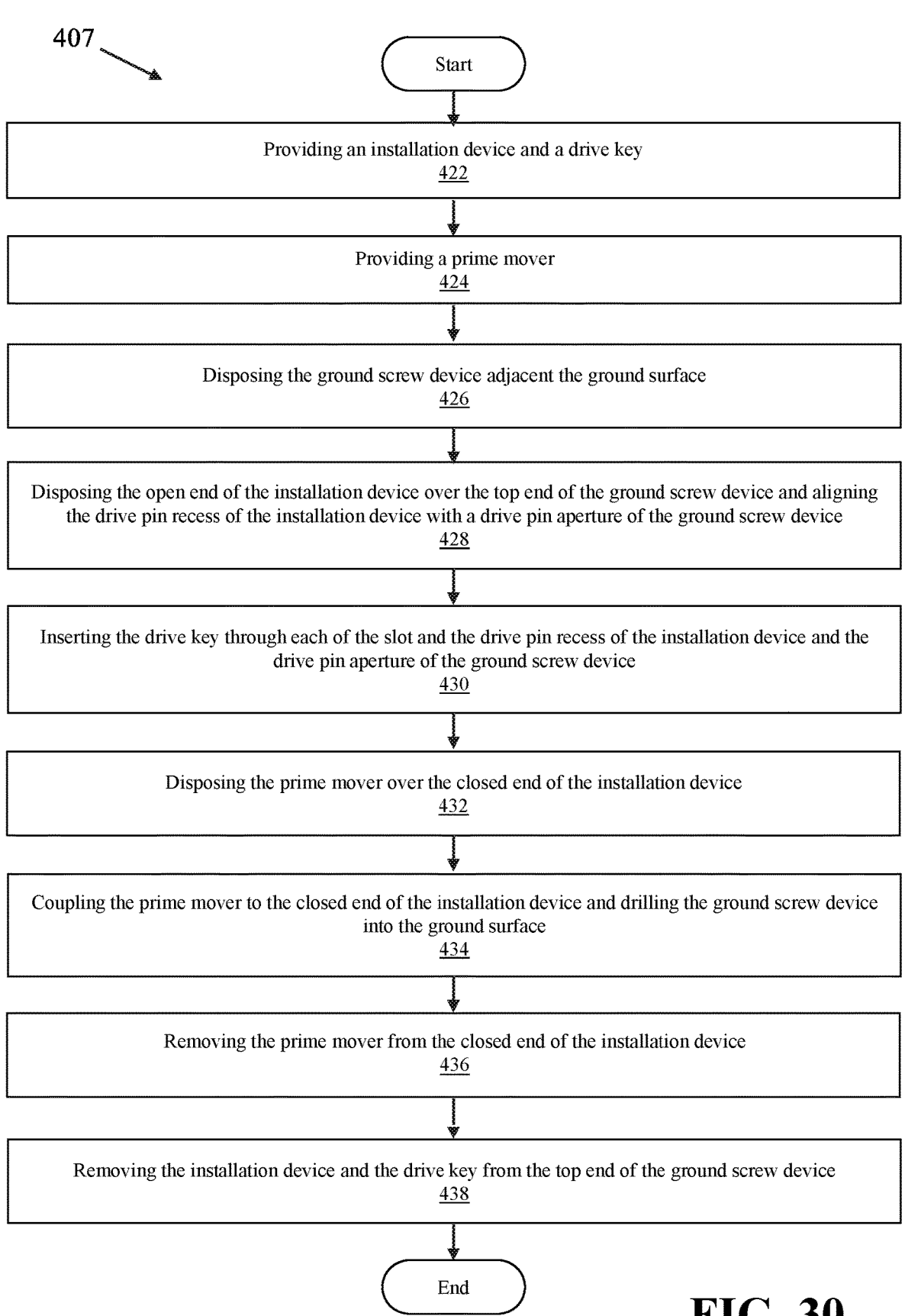

Start

Providing an installation device and a drive key
422

Providing a prime mover
424

Disposing the ground screw device adjacent the ground surface
426

Disposing the open end of the installation device over the top end of the ground screw device and aligning the drive pin recess of the installation device with a drive pin aperture of the ground screw device
428

Inserting the drive key through each of the slot and the drive pin recess of the installation device and the drive pin aperture of the ground screw device
430

Disposing the prime mover over the closed end of the installation device
432

Coupling the prime mover to the closed end of the installation device and drilling the ground screw device into the ground surface
434

Removing the prime mover from the closed end of the installation device
436

Removing the installation device and the drive key from the top end of the ground screw device
438

End

FIG. 30

MULTIPART GROUND SCREW COLLAR DEVICE, ASSEMBLY, SYSTEM, AND METHOD

CROSS-REFERENCE TO RELATED APPLICATIONS

This application claims the benefit of U.S. Provisional Application No. 63/422,783 filed on Nov. 4, 2022. The entire disclosure of the above application is hereby incorporated herein by reference.

FIELD

The present technology relates to racking systems and, more particularly, devices for installing racking systems for solar panels.

INTRODUCTION

This section provides background information related to the present disclosure which is not necessarily prior art.

Renewable energy, such as solar energy, is a fast-growing energy source, especially with the rising cost of non-renewable energy sources. One method of harnessing solar energy is by installing an array of solar panels to buildings or the ground. Ground mounted solar arrays may be attached to a racking system secured to a foundation pile, such as a helical pile or ground screw, which penetrates the ground surface to stabilize and support the structure. A pile foundation may be defined as a column or series of columns constructed or inserted into the ground to transmit loads to a lower level of subsoil. A pile may be a long cylinder made up of a strong material, such as concrete. Piles are pushed into the ground to act as a steady support for structures built on top of them. Piles may transfer a load from a structure such as solar array to hard strata, rocks, or soil with high bearing capacity. A pile may support the structure by remaining solidly placed in the soil. As pile foundations are set in the soil, they are more tolerant to erosion and scour.

The foundation pile may also absorb compressive and tensile forces created by the weight of the structure, wind load, and snow, among other loads. As such, the type of foundation pile employed is influenced by soil composition, climate conditions, module size, and array tilt, among other features. It is important that the pile foundation is stable so that the foundation may absorb the compressive and tensile forces of the structure. A ground screw may allow a racking system to be installed on a site with rock, bedrock, glacial till or caliche soil.

Previous approaches to installation of pile foundations often required multiple steps and separate components as well as on-site installation of the pile foundation into the ground. On-site installation further includes welding different fasteners to the pile foundation to secure the pile foundation to the solar panel installation. Ultimately, this has increased the complexity and time required for installation, as well as the risk of misalignment or loosening of the system during use. Additionally, removal of the pile foundation from the ground surface resulted in an additional time-consuming effort with supplementary tools to forcefully remove the pile foundation from the solar panel installation, which may damage the pile foundation.

Accordingly, there is a need for a system and method that is easy to transport and install on-site as part of a solar racking installation system.

SUMMARY

In concordance with the instant disclosure, a system and method that is easy to transport and install on-site as part of a solar racking installation system, has surprisingly been discovered.

The present technology includes articles of manufacture, assemblies, systems, and processes that relate to a collar device and ground screw device for a racking system.

In one embodiment, a collar device for a multi-part ground screw is provided. The collar device may include an annular main body having a collar device inner surface and a collar device outer surface with at least one aperture formed through the annular main body and at least one aperture having a hexagons shape. The collar device may further include at least one fastener assembly including a fastener having a head and a threaded post, a locking washer, a hexnut washer having a nut portion with a hexagon shape and a washer portion. The locking washer may be disposed on the threaded post of the fastener between the head of the fastener and the collar device outer surface, and the hexnut washer may be disposed in the at least one aperture. The nut portion of the hexnut washer may have an interference fit or a low tolerance fit with the at least one aperture, and the washer portion of the hexnut washer may be disposed adjacent the collar device inner surface.

In another embodiment, a multi-part ground screw assembly including a collar device and ground screw device is provided. The ground screw device may include an elongate main body having a top end, a bottom end, a ground screw outer surface, a ground screw inner surface, a non-threaded portion, and a threaded portion. The non-threaded portion may be disposed adjacent the top end of the elongate main body and the non-threaded portion may have at least one hole formed through the non-threaded portion of the elongate main body. The threaded portion may be disposed adjacent the bottom end of the elongate main body. The collar device may be disposed over the top end of the ground screw device, and the at least one aperture of the collar device may be aligned with the at least one hole of the ground screw device. The washer portion of the hexnut washer of the at least one fastener assembly may be disposed between the collar device inner surface and the ground screw outer surface, and the threaded post of the fastener may be disposed through each of the at least one aperture of the collar device, the locking washer, the hexnut washer of the at least one fastener assembly, and the at least one hole of the ground screw device.

In a further embodiment, an installed racking system is provided which includes a collar device, a ground screw device, and a racking device. The racking device may include a support leg with a lower end, an upper end, a support leg outer surface, and a support leg inner surface. The lower end of the racking device may be disposed within each of the collar device and the ground screw device. The support leg may be affixed with the collar device and the ground screw device by an impinging of the at least one fastener assembly against the support leg outer surface.

In another embodiment, an installation method is provided whereby an installation device and drive key may be utilized to install the ground screw device into a ground surface. The method may also include steps of coupling the collar device to the ground screw device and further coupling the racking device to each of the collar device and the ground screw device via fasteners.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 14 is a cross-sectional view of the collar device assembled;

FIG. 15 is a cross-sectional view of the collar device and ground screw assembly;

FIG. 16 is a cross-sectional view of the multipart ground screw collar assembly prior to fastening the fasteners;

FIG. 17 is a cross-sectional view of the multipart ground screw collar assembled;

FIG. 18 is a portion of the ground screw with at least one hole prior to installation of the fastener;

FIG. 19 is a portion of the ground screw after installation of the fastener;

FIG. 20 is a portion of the ground screw showing displacement of material around the at least one hole after installation of the fastener;

FIG. 21 is a top perspective view of another embodiment of the collar device in three pieces;

FIG. 23 is an environmental view of the ground screw device installation using the installation device and drive key;

FIG. 24 is an environmental view of the ground screw device with the installation device and drive key coupled to the ground screw device;

FIG. 25 is an environmental view of the ground screw device coupled to a prime mover and installed into a ground surface;

FIG. 26 is an environmental view of the installation device and drive key removed from the ground screw device;

FIG. 27 is an environmental view of the ground screw installed into the ground surface;

FIG. 28 is an environmental view of the ground screw device coupled with the collar device and the racking device;

Figure 1:
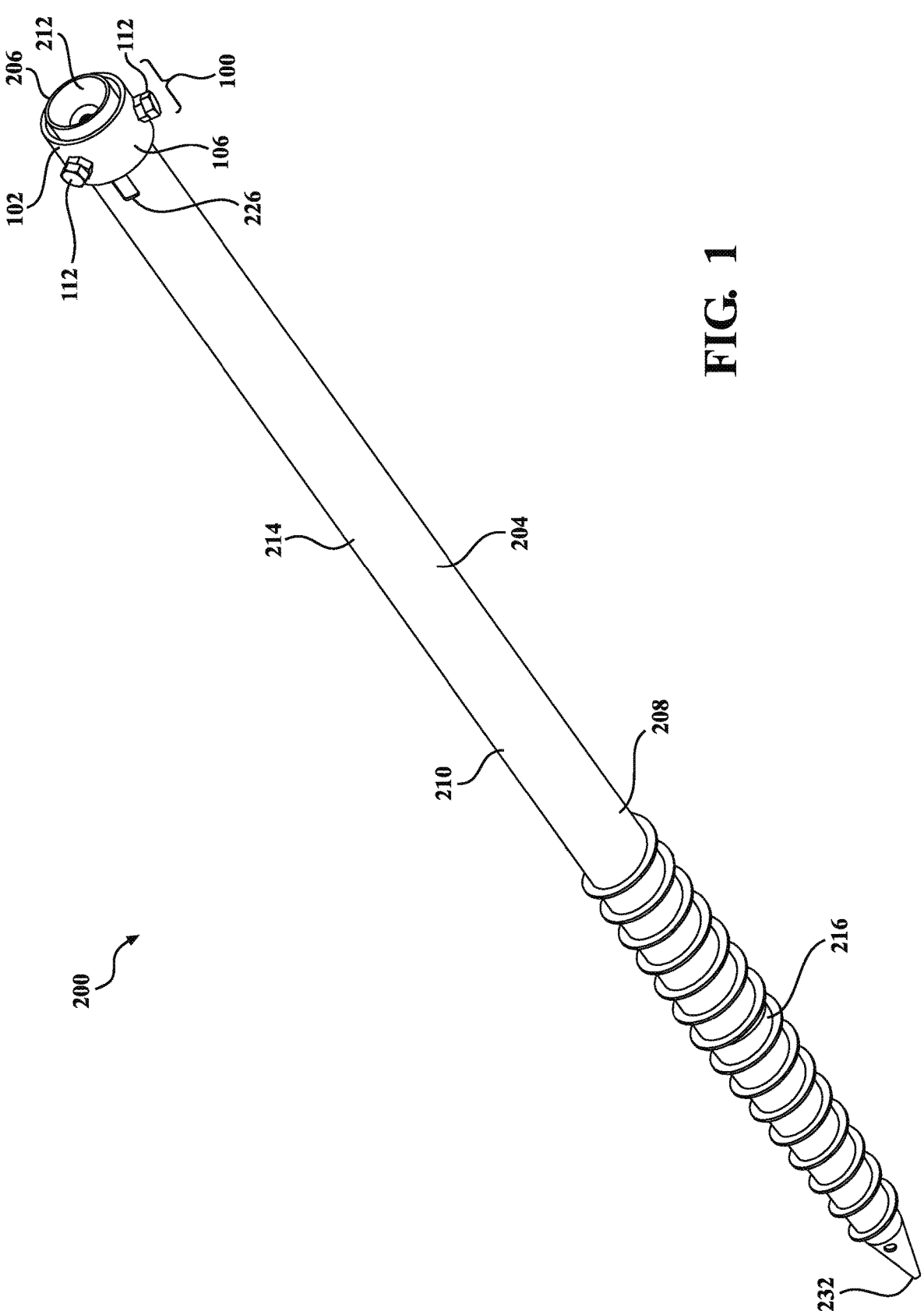
FIG. 1 is a top perspective view of a multipart ground screw collar device according to an embodiment of the present disclosure.
Figure 2:
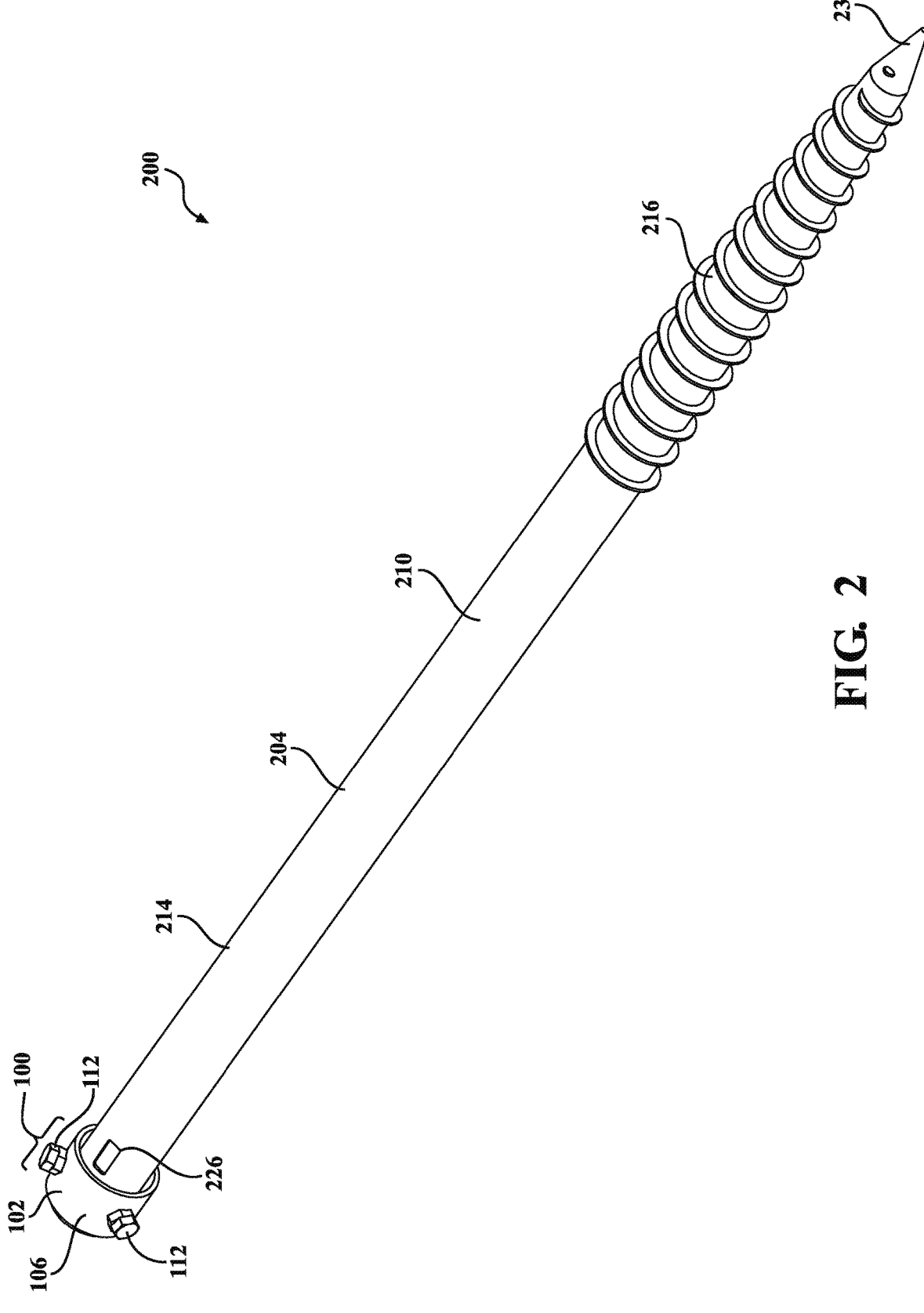
FIG. 2 is a bottom perspective view of the multipart ground screw collar device shown in FIG. 1.
Figure 3:
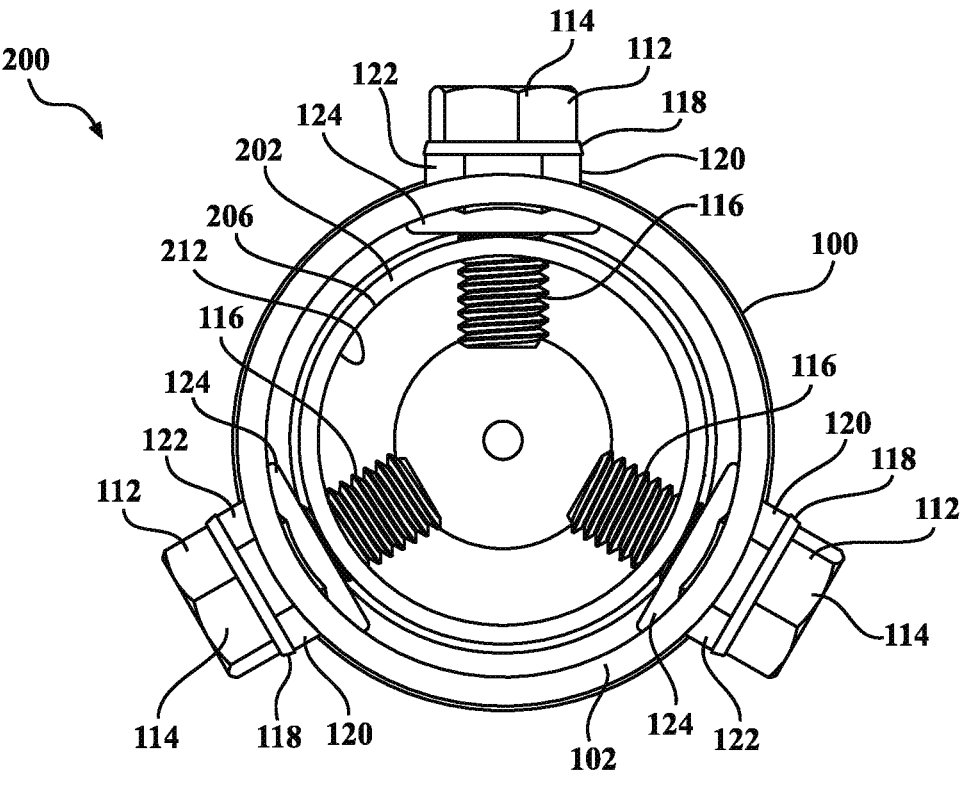
FIG. 3 is a top plan view of the multipart ground screw collar device shown in FIG. 1.
Figure 4:
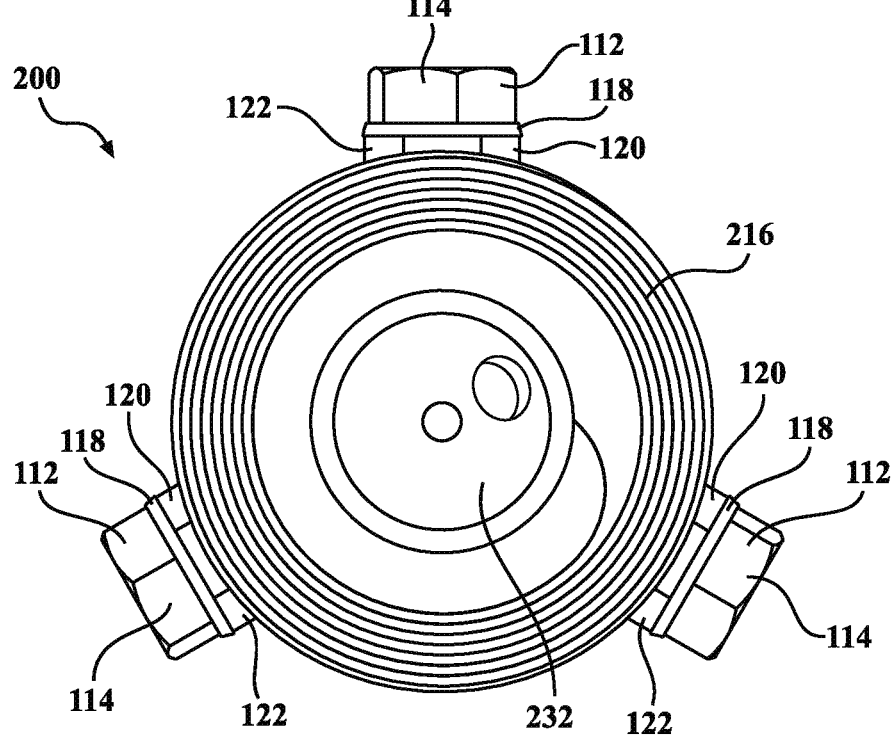
FIG. 4 is a bottom plan view of the multipart ground screw collar device shown in FIG. 1.
Figure 5:
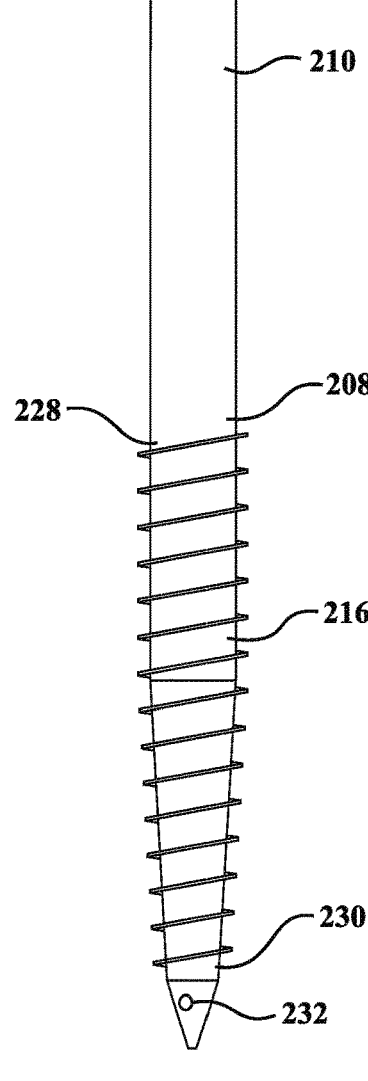
FIG. 5 is a front elevational view of the multipart ground screw collar device shown in FIG. 1.
Figure 6:
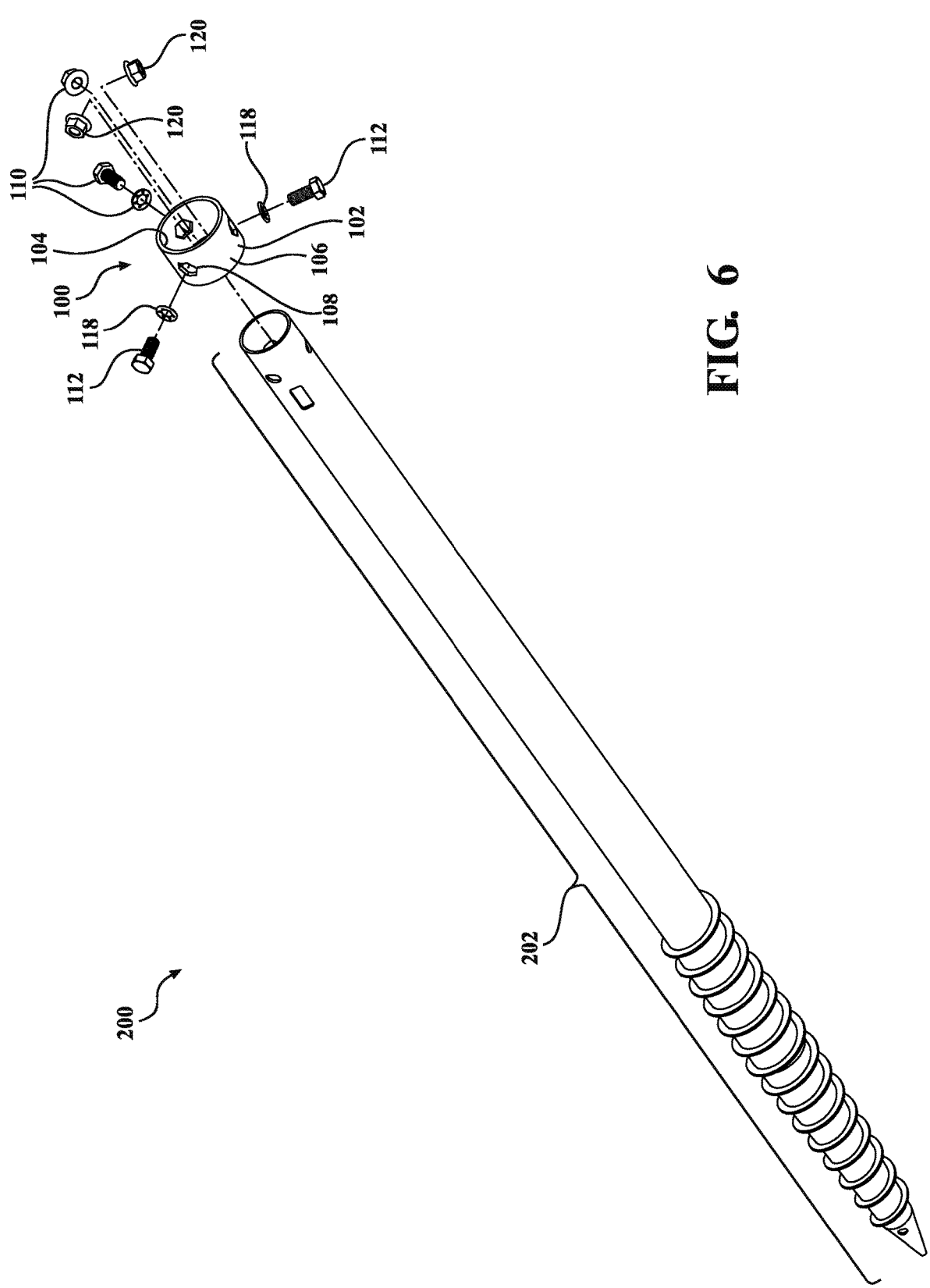
FIG. 6 is an exploded view of the multipart ground screw collar device shown in FIG. 1.
Figure 7:
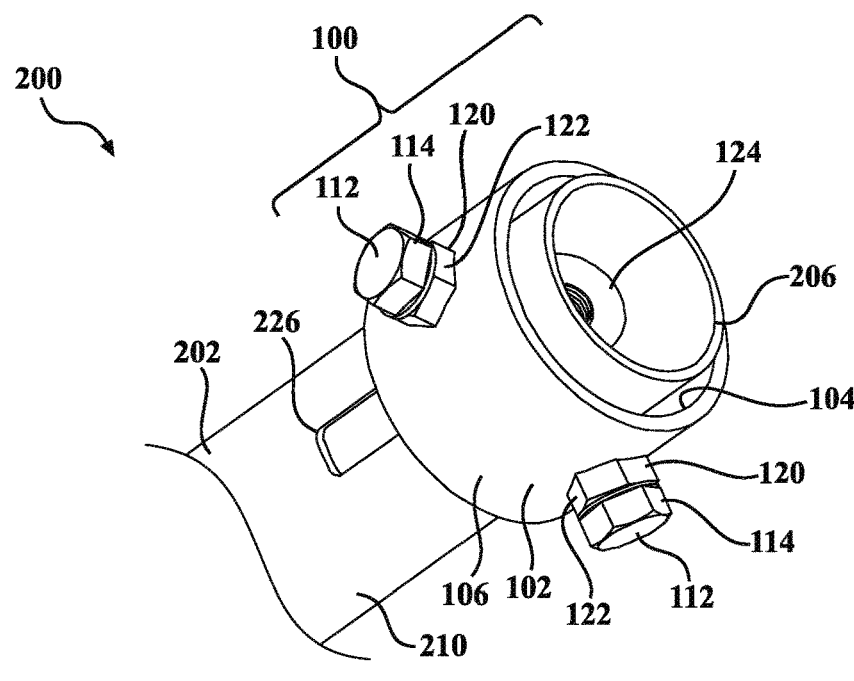
FIG. 7 is a portion of the collar device shown in FIG. 1.
Figure 8:
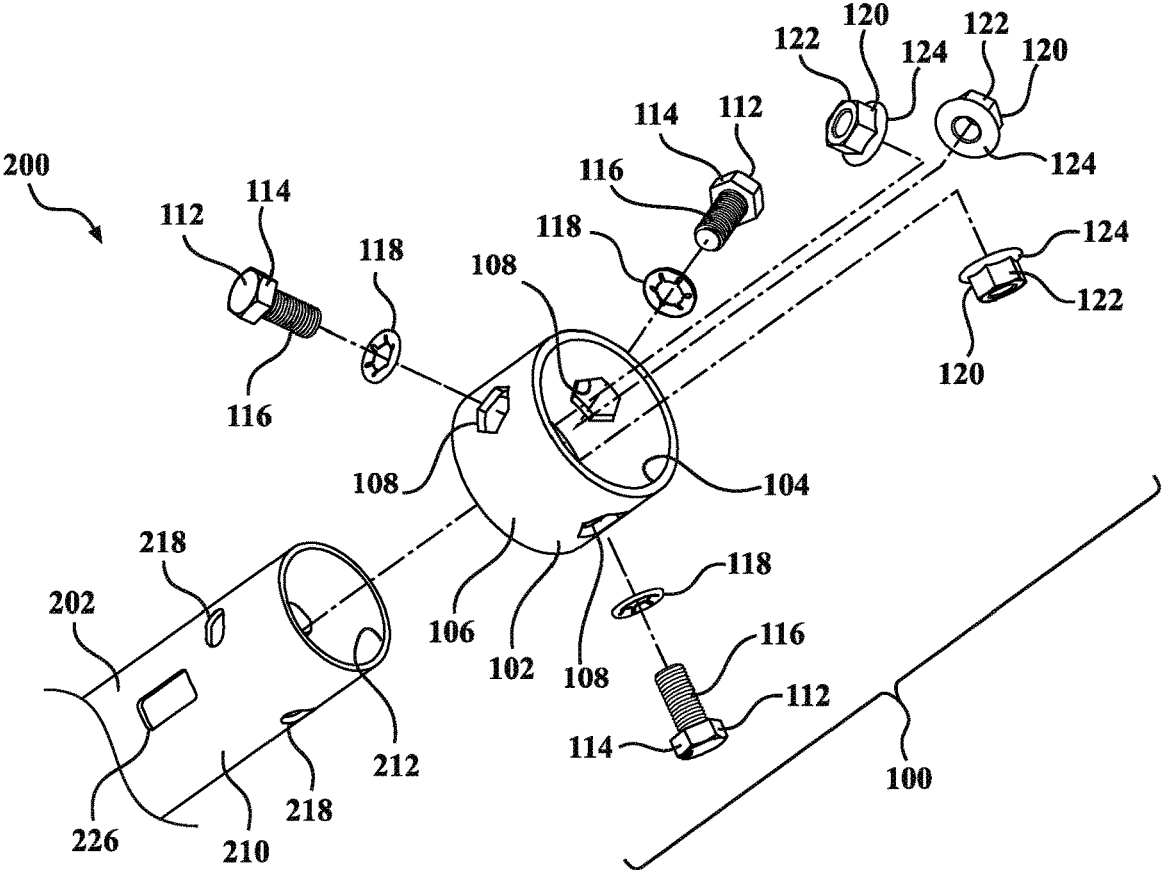
FIG. 8 is an exploded view of a portion of the collar device shown in FIG. 7.

FIG. 29 is a flowchart illustrating an installation method of the multi-part ground screw collar device assembly according to an embodiment of the present disclosure; and FIG. 30 is a flowchart illustrating an installation method of the multi-part ground screw collar device assembly according to an embodiment of the present disclosure, the installation method including use of an installation device and a drive key.

DETAILED DESCRIPTION

The following description of technology is merely exemplary in nature of the subject matter, manufacture and use of one or more inventions, and is not intended to limit the scope, application, or uses of any specific invention claimed in this application or in such other applications as may be filed claiming priority to this application, or patents issuing therefrom. Regarding methods disclosed, the order of the steps presented is exemplary in nature, and thus, the order of the steps can be different in various embodiments, including where certain steps can be simultaneously performed, unless expressly stated otherwise. "A" and "an" as used herein indicate "at least one" of the item is present; a plurality of such items may be present, when possible. Except where otherwise expressly indicated, all numerical quantities in this description are to be understood as modified by the word "about" and all geometric and spatial descriptors are to be understood as modified by the word "substantially" in describing the broadest scope of the technology. "About" when applied to numerical values indicates that the calculation or the measurement allows some slight imprecision in the value (with some approach to exactness in the value; approximately or reasonably close to the value; nearly). If, for some reason, the imprecision provided by "about" and/or "substantially" is not otherwise understood in the art with this ordinary meaning, then "about" and/or "substantially" as used herein indicates at least variations that may arise from ordinary methods of measuring or using such parameters.

All documents, including patents, patent applications, and scientific literature cited in this detailed description are incorporated herein by reference, unless otherwise expressly indicated. Where any conflict or ambiguity may exist between a document incorporated by reference and this detailed description, the present detailed description controls.

Although the open-ended term "comprising," as a synonym of non-restrictive terms such as including, containing, or having, is used herein to describe and claim embodiments of the present technology, embodiments may alternatively be described using more limiting terms such as "consisting of" or "consisting essentially of" Thus, for any given embodiment reciting materials, components, or process steps, the present technology also specifically includes embodiments consisting of, or consisting essentially of, such materials, components, or process steps excluding additional materials, components or processes (for consisting of) and excluding additional materials, components or processes affecting the significant properties of the embodiment (for consisting essentially of), even though such additional materials, components or processes are not explicitly recited in this application. For example, recitation of a composition or process reciting elements A, B and C specifically envisions embodiments consisting of, and consisting essentially of, A, B and C, excluding an element D that may be recited in the art, even though element D is not explicitly described as being excluded herein.

As referred to herein, all compositional percentages are by weight of the total composition, unless otherwise specified. Disclosures of ranges are, unless specified otherwise, inclusive of endpoints and include all distinct values and further divided ranges within the entire range. Thus, for example, a range of "from A to B" or "from about A to about B" is inclusive of A and of B. Disclosure of values and ranges of values for specific parameters (such as amounts, weight percentages, etc.) are not exclusive of other values and ranges of values useful herein. It is envisioned that two or more specific exemplified values for a given parameter may define endpoints for a range of values that may be claimed for the parameter. For example, if Parameter X is exemplified herein to have value A and also exemplified to have value Z, it is envisioned that Parameter X may have a range of values from about A to about Z. Similarly, it is envisioned that disclosure of two or more ranges of values for a parameter (whether such ranges are nested, overlapping or distinct) subsume all possible combination of ranges for the value that might be claimed using endpoints of the disclosed ranges. For example, if Parameter X is exemplified herein to have values in the range of 1-10, or 2-9, or 3-8, it is also envisioned that Parameter X may have other ranges of values including 1-9, 1-8, 1-3, 1-2, 2-10, 2-8, 2-3, 3-10, 3-9, and so on.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The present technology relates to a collar device 100 for a multi-part ground screw assembly 200, an installed racking system 300, and an installation method 400. Advantageously, the collar device 100 is coupled to the ground screw device 202 rather than welded together to provide a cost effective and easy system with the capability to remove the collar device 100 when desired.

FIGS. 1-5 illustrate a multi-part ground screw assembly 200 with a collar device 100, according to an embodiment of the present disclosure. The collar device 100 may include an annular main body 102 and at least one fastener assembly 110. The annular main body 102 may include a collar device inner surface 104 and a collar device outer surface 106 with at least one aperture 108 formed through the annular main body 102 from the collar device inner surface 104 to the collar device outer surface 106. Desirably, the collar device 100 increases the structural strength of a multi-part ground screw assembly 200 by reducing damaged threads commonly found on prior art foundations and prior art ground screw devices.

The annular main body 102 may be galvanized prior to installation and separately from the multi-part ground screw assembly 200. Advantageously, the galvanization of the annular main body 102 prior to installation protects the material of the collar device 100 and militates against deterioration of the annular main body 102 when exposed to outdoor conditions.

With reference to FIGS. 1-13, the annular main body 102 of the collar device 100 may be unitary and provided as a single component. Advantageously, the collar device 100 is provided as a single component for an easy to transport device for on-site installation. In another embodiment, the annular main body 102 may be provided in multiple pieces coupled together to form a collar device 500, as further explained below.

Figure 12:
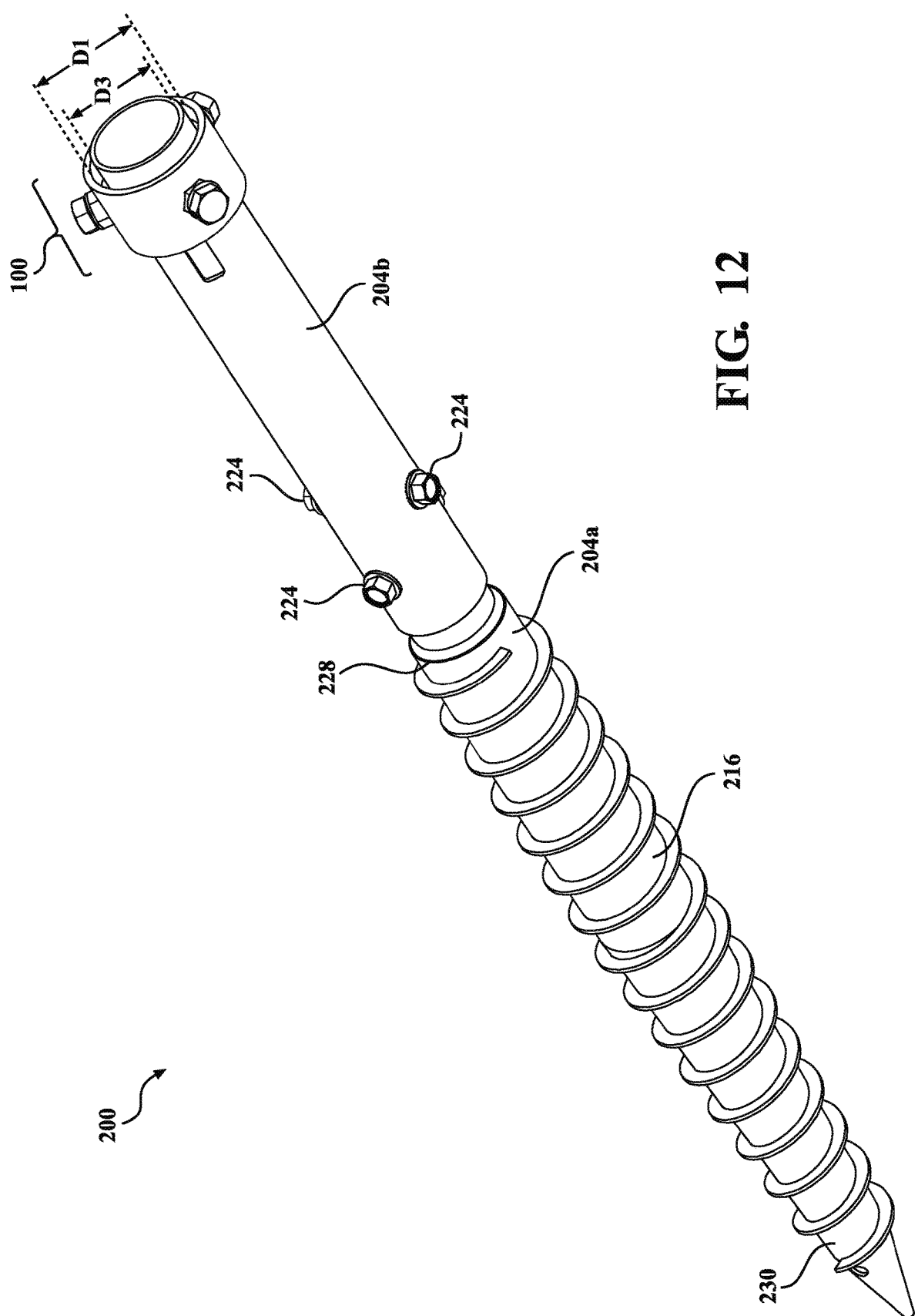
FIG. 12 is a top perspective view of another embodiment of the multipart ground screw collar device.

With reference to FIG. 12, the annular main body 102 may further have a minimum collar device inner diameter (D1). The minimum collar device inner diameter (D1) may be defined as the inner diameter of the annular main body 102 of the collar device 100. As further explained below, the minimum collar device inner diameter (D1) of the annular main body 102 may be larger than the minimum ground screw inner diameter (D3) of the ground screw device 202 so as to allow the collar device 100 to be coupled over the ground screw device 202 for installation in an installed racking system 300. One of ordinary skill in the art may select suitable dimensions for the minimum collar device diameter (D1) within the scope of the present disclosure.

With renewed reference to FIGS. 1-8 and 12-13, the at least one aperture 108 may have a hexagonal shape. In another embodiment, the at least one aperture 108 may have a different polygonal shape. One of ordinary skill in the art may select a suitable shape for the at least one aperture 108 within the scope of the present disclosure.

As shown in FIGS. 1-8 and 12-13, the annular main body 102 may include a plurality of apertures 108, in an embodiment of the present disclosure. Likewise, each of the at least one aperture 108 of the annular main body 102 may be laser cut. Desirably, the laser cutting technique provides the hexagonal shape of the at least one aperture 108 of the annular main body 102 of the collar device 100 and militates against an unprecise hexagonal shape of the at least one aperture 108. Further, the plurality of apertures 108 may be substantially evenly spaced apart around the annular main body 102. The plurality of apertures 108 may be substantially centrally disposed on the annular main body 102 of the collar device 100. In particular, and in a certain embodiment, the annular main body 102 may include three apertures 108. One of ordinary skill in the art may select a suitable number of apertures 108 to form through the annular main body 102 of the collar device 100 as well as a suitable configuration of the plurality of apertures 108 within the scope of the present disclosure.

With continued reference to FIGS. 1-8, the at least one fastener assembly 110 may include a fastener 112, a locking washer 118, and a hexnut washer 120. The fastener 112 may include a head 114 and a threaded post 116. The fastener 112 may be disposed through the at least one aperture 108 of the annular main body 102 from the collar device outer surface 106. The hexnut washer 120 may also include a nut portion 122 and a washer portion 124. The nut portion 122 may include a hexagon shape and the washer portion 124 may include a circular shape. Advantageously, the hexagonal shape of the nut portion 122 and the circular shape of the washer portion 124 militates against potential rotation or loosening of the hexnut washer 120 and keeps the hexnut washer 120 secured in the at least one aperture 108, respectively.

Additionally, the locking washer 118 may be disposed adjacent the collar device outer surface 106. More particularly, the locking washer 118 may be disposed on the threaded post 116 of the fastener 112 between the head 114 of the fastener 112 and the collar device outer surface 106. The hexnut washer 120 may be disposed in the at least one aperture 108 and the nut portion 122 of the hexnut washer 120 may have an interference fit or a low tolerance fit with the at least one aperture 108 of the annular main body 102, which further secures the hexnut washer 120 in place. The washer portion 124 of the hexnut washer 120 may be disposed adjacent the collar device inner surface 104. Further, the at least one fastener assembly 110 may include a plurality of fastener assemblies 110, as shown in FIGS. 1-5. More particularly, the collar device 100 may include three fastener assemblies 110. One of ordinary skill in the art may select a suitable number of fastener assemblies 110 within the scope of the present disclosure.

As a non-limiting example, the fastener 112 may be a Bolt-Class 6 M16 0 2.0×35 mm RH Fully Threaded Screw. As a non-limiting example, the locking washer 118 may be an M14 Steel Self-Locking Pal Nut. As another non-limiting example, the hexnut washer 120 may be an M16-2 Flanged HexNut. One of ordinary skill in the art may select a suitable fastener 112, locking washer 118, and hexnut washer 120 as part of the fastener assembly 110 within the scope of the present disclosure.

Figure 22:
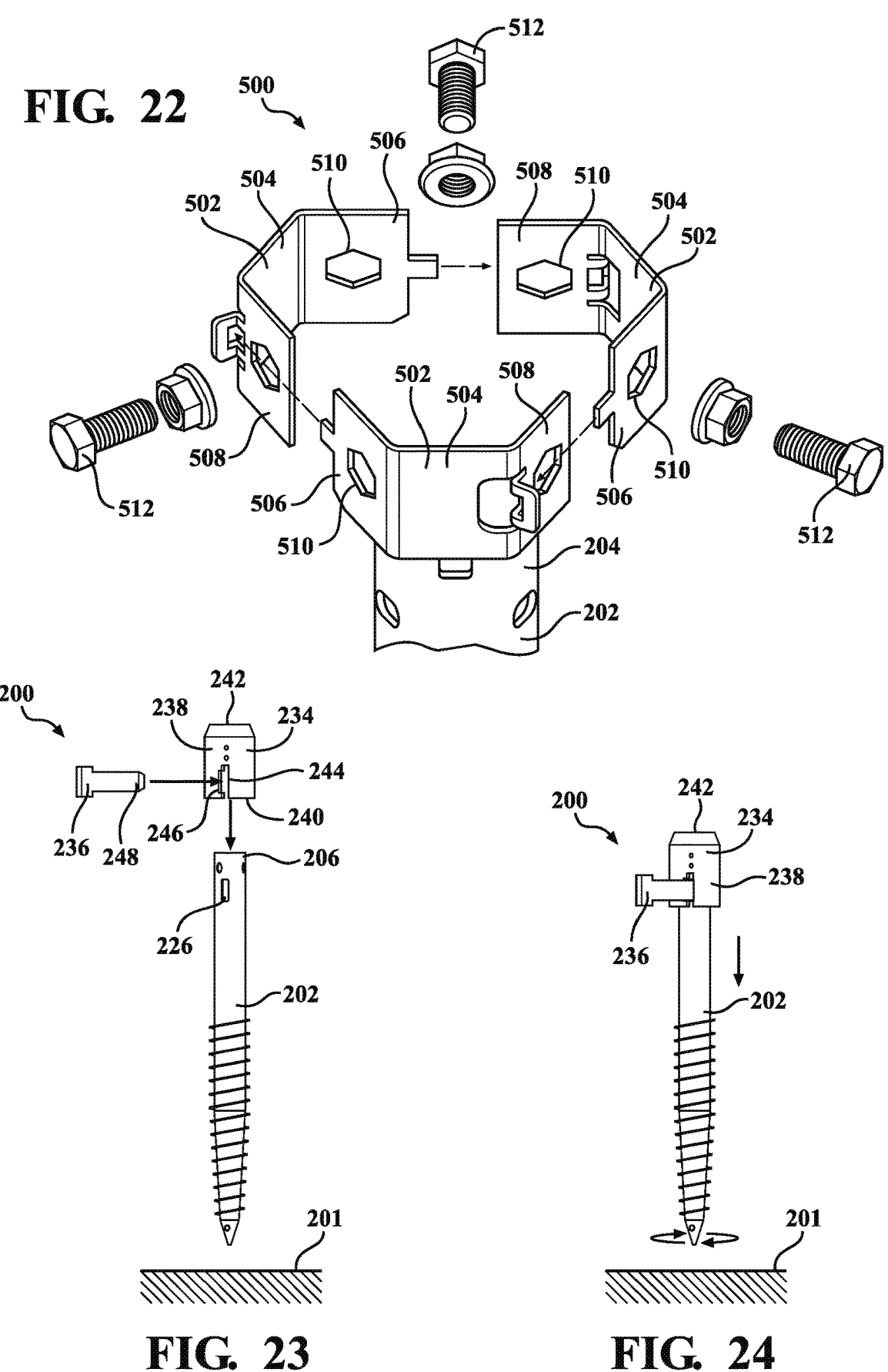
FIG. 22 is an exploded view of the collar device shown in FIG. 21.

In another embodiment, with reference to FIGS. 21 and 22, a collar device 500 may be provided. Like or similar structure to that shown and described in FIGS. 1-20 and 23-28 is shown and described in FIGS. 21 and 22 with a same number but in a 500-series for simplicity.

With continued reference to FIGS. 21 and 22, the collar device 500 may include a modular main body 502 including a plurality of brackets 504. The plurality of brackets 504 may be configured to align together in an assembled configuration. More particularly, each of the plurality of brackets 504 may include a locking end 506, a receiving end 508, and a plurality of holes 510. The plurality of brackets 504 may be fastened together using mechanical fasteners 512, as shown in FIG. 21. Each of the plurality of brackets 504 may be overlaid against one another to align the plurality of holes 510, resulting in a ring-like shape. The locking end 506 of each of the plurality of brackets 504 may latch into the receiving end 508 of the plurality of brackets 504, thus securely coupling each of the plurality of brackets 504 to provide the collar device 500. Advantageously, the collar device 500 may easily be fastened for on-site installation and alternatively may be easily removed upon coupling to a multi-part ground screw assembly 200.

With renewed reference to FIGS. 1-11, the multi-part ground screw assembly 200 may include a ground screw device 202. The ground screw device 202 may include an elongate main body 204. The elongate main body 204 may include a top end 206 and a bottom end 208. The elongate main body 204 may also include a ground screw outer surface 210, a ground screw inner surface 212, a non-threaded portion 214, and a threaded portion 216. The non-threaded portion 214 may be disposed adjacent the top end 206 of the elongate main body 204. The non-threaded portion 214 may further have at least one hole 218 formed through the non-threaded portion 214 of the elongate main body 204 from the ground screw outer surface 210 to the ground screw inner surface 212. The threaded portion 216 may be disposed adjacent the bottom end 208 of the elongate main body 204. Further, the elongate main body 204 of the ground screw device 202 may be unitary. The ground screw device 202 may be independently pre-galvanized prior to use and installation. Advantageously, galvanizing the ground screw device 202 independently provides extra strength and militates against deterioration of the ground screw device 202 when installed into a ground surface 201.

As shown in FIGS. 1-11 and 18-20, the at least one hole 218 of the ground screw device 202 may be elongate. As a non-limiting example, the dimensions of the at least one hole 218 may be 0.555 inches by 0.825 inches. One of ordinary skill in the art may select suitable dimensions for the at least one hole 218 of the ground screw device 202.

With continued reference to FIGS. 1-11 and 18-20, the at least one hole 218 may have a jellybean shape. The at least one hole 218 of the ground screw device 202 may further have a maximum hole length (L1) and a maximum hole height (H1) prior to the disposing of the at least one fastener assembly 110 into the at least one hole 218 of the ground screw device 202. The threaded post 116 may also include a maximum post diameter (D2). The maximum hole height (H1) of the at least one hole 218 may be less than the maximum post diameter (D2) of the threaded post 116 of the fastener 112 prior to a disposing of the at least one fastener assembly 110 into the ground screw device 202. The at least one hole 218 of the ground screw device 202 may also include a top edge 220 and a bottom edge 222, whereby both the top edge 220 and the bottom edge 222 may define the maximum hole height (H1) of the at least one hole 218 of the ground screw device 202, as shown in FIG. 18. The material adjacent the top edge 220 and the bottom edge 222 of the at least one hole 218 may be displaced upon disposing of the at least one fastener assembly 110 into the at least one hole 218 of the ground screw device 202, as specifically shown in FIG. 20, thus defining the displaced hole height (H2). Again, as illustrated in FIG. 20, the displaced hole height (H2) may be greater than the maximum hole height (H1) after placement of the fastener 112 into the at least one hole 218 due to the displacement of the material around the at least one hole 218 of the ground screw device 202. Advantageously, this provides an interference fit to militate against potential loosening of the at least one fastener assembly 110 from the multi-part ground screw assembly 200.

Figure 13:
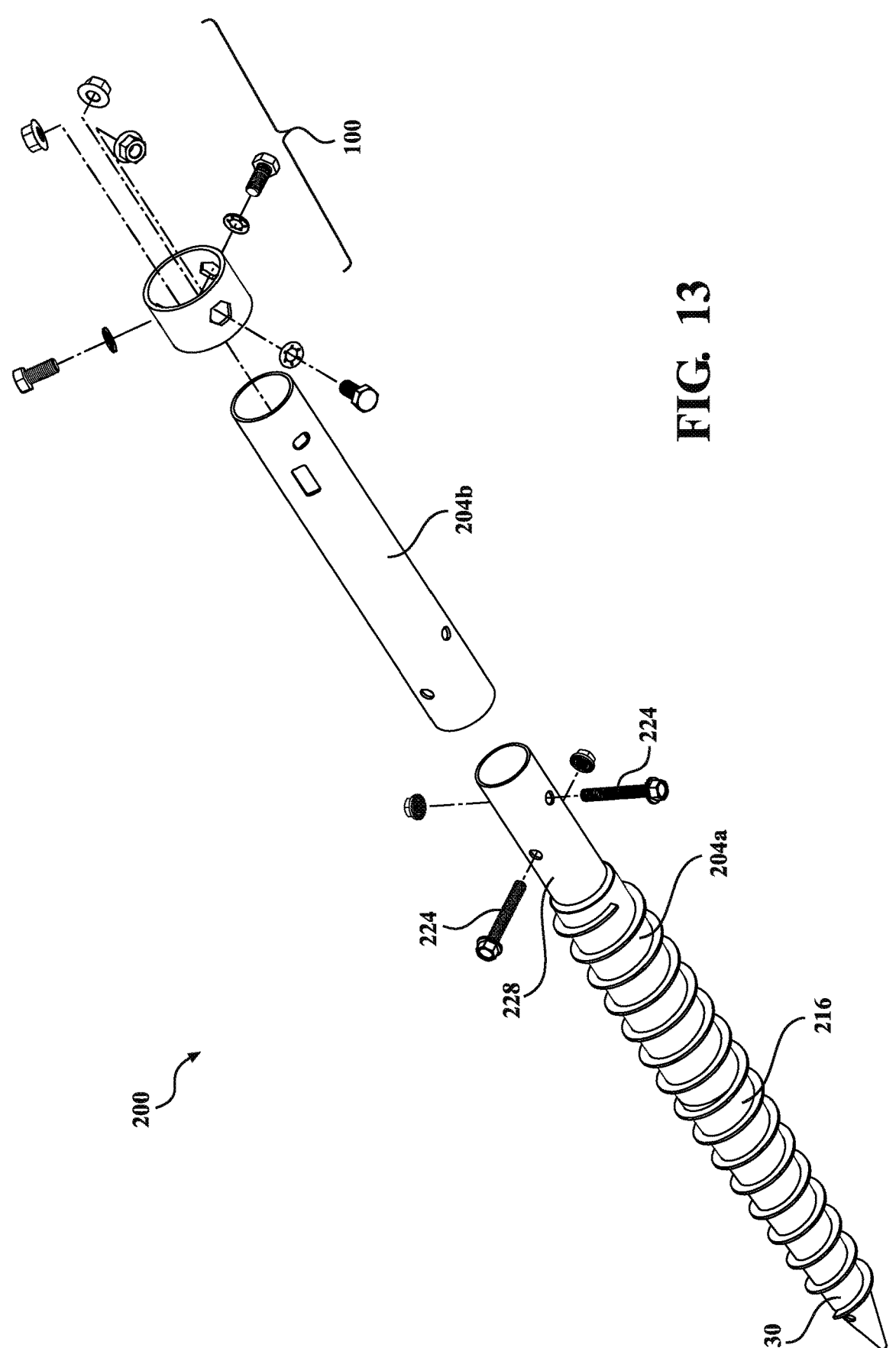
FIG. 13 is an exploded view of the multipart ground screw collar device shown in FIG. 12.

Alternatively, with reference to FIGS. 12-13, the elongate main body 204 of the ground screw device 202 may be formed in multiple pieces including a first piece 204*a* and a second piece 204*b* rather than the elongate main body 204 formed as a single, unitary component. In particular, the threaded portion 216 of the elongate main body 204 may be formed as the first piece 204*a* and the non-threaded portion 214 of the elongate main body 204 may be formed as the second piece 204*b*. The first piece 204*a* and the second piece 204*b* may be selectively coupled together with at least one ground screw fastener 224. As a non-limiting example, the at least one ground screw fastener 224 may be a serrated nut coupled with a serrated flange bolt with a full thread. One of ordinary skill in the art may select a suitable configuration for the ground screw device 202 as well as a suitable ground screw fastener 224 within the scope of the present disclosure.

With additional reference to FIGS. 1-11 and 23-28, the ground screw device 202 may include a drive pin aperture 226. The drive pin aperture 226 may be formed through the non-threaded portion 214 of the elongate main body 204 from the ground screw outer surface 210 to the ground screw inner surface 212. The drive pin aperture 226 may include a rectangular shape as well. The drive pin aperture 226 may be substantially spaced apart both axially and laterally from the at least one hole 218 in the elongate main body 204 of the ground screw device 202. As a non-limiting example, the dimensions of the drive pin aperture 226 may be 1.531 inches by 0.656 inches. One of ordinary skill in the art may select suitable dimensions for the drive pin aperture 226 within the scope of the present disclosure.

With continued reference to FIGS. 1-11 and 23-28, the ground screw device 202 may also include an installation device 234 and a drive key 236 for installation of the ground screw device 202, as further explained hereinbelow. The installation device 234 may have a tubular main body 238. The tubular main body 238 may be provided with an open end 240, a closed end 242, and a slot 244 with a drive pin recess 246. The slot 244 and the drive pin recess 246 may be disposed between the open end 240 and the closed end 242 of the tubular main body 238. Additionally, the slot 244 and the drive pin recess 246 may be rectangular in shape, to accommodate the drive pin aperture 226. The drive pin recess 246 may be centrally disposed adjacent the slot 244. The installation device 234 may be configured to be selectively removably disposed over the top end 206 of the ground screw device 202 and coupled with the drive key 236 for installation of the ground screw device 202 into the ground surface 201. The installation device 234 may also be coupled with a prime mover 250, configured to drive the rotation of the installation device 234 and the ground screw device 202 for installation of the ground screw device 202 into the ground surface 201, as further described hereinbelow.

Additionally, with continued reference to FIGS. 1-11 and 23-28, the drive key 236 may have a tapered main body 248. The tapered main body 248 may also have a rectangular shape. Advantageously, the rectangular shape of the drive key 236 allows the drive key 236 to be selectively coupled to the rectangular shape of the drive pin aperture 226 of the ground screw device 202 and further allows the drive pin aperture 226 to receive the drive key 236. One of ordinary skill in the art may select a suitable shape for the drive key 236 and the drive pin aperture 226 within the scope of the present disclosure.

The drive key 236 may be configured to be disposed through each of the slot 244 and the drive pin recess 246 of the installation device 234, as well as the drive pin aperture 226 of the ground screw device 202. Advantageously, the installation device 234 and the drive key 236 allow installers to rapidly install foundations and ground screw devices 202 without damaging the foundations and ground screw devices 202 when using a high-torque prime mover 250 in hard, rocky soils.

With further reference to FIGS. 1-11, the threaded portion 216 of the ground screw device 202 may have a first end 228 and a second end 230. The first end 228 of the threaded portion 216 of the ground screw device 202 may be coupled to the non-threaded portion 214 of the ground screw device 202. The first end 228 of the threaded portion 216 of the ground screw device 202 may be disposed adjacent the non-threaded portion 214 of the ground screw device 202. The second end 230 of the threaded portion 216 of the ground screw device 202 may have a pointed tip 232. The pointed tip 232 may be configured to be disposed through the ground surface 201 for installation of the ground screw device 202. One of ordinary skill in the art may select a suitable ground screw device 202 within the scope of disclosure.

Figure 10:
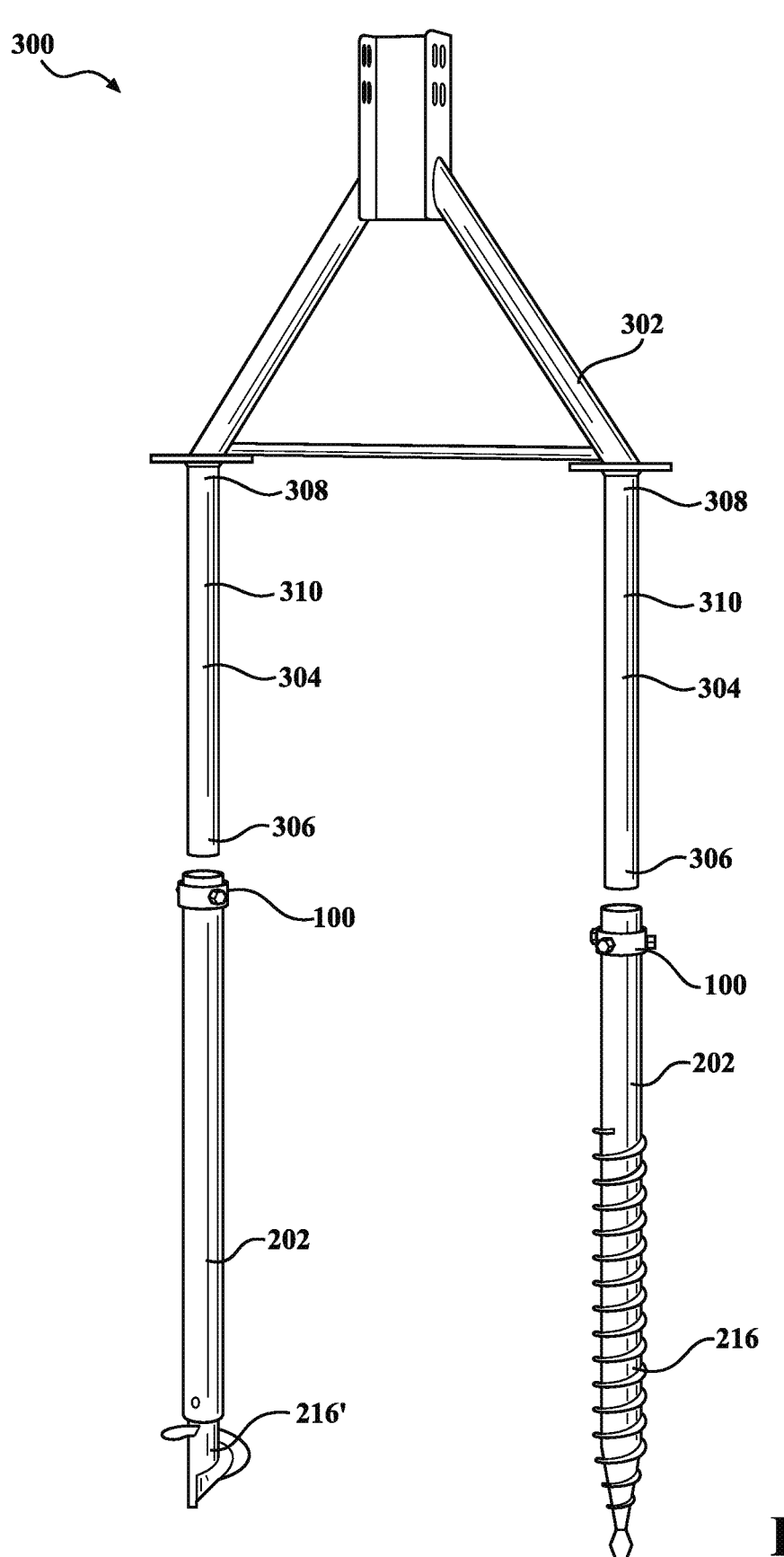
FIG. 10 is a portion of an environmental view of the multipart ground screw collar device assembled.
Figure 11:
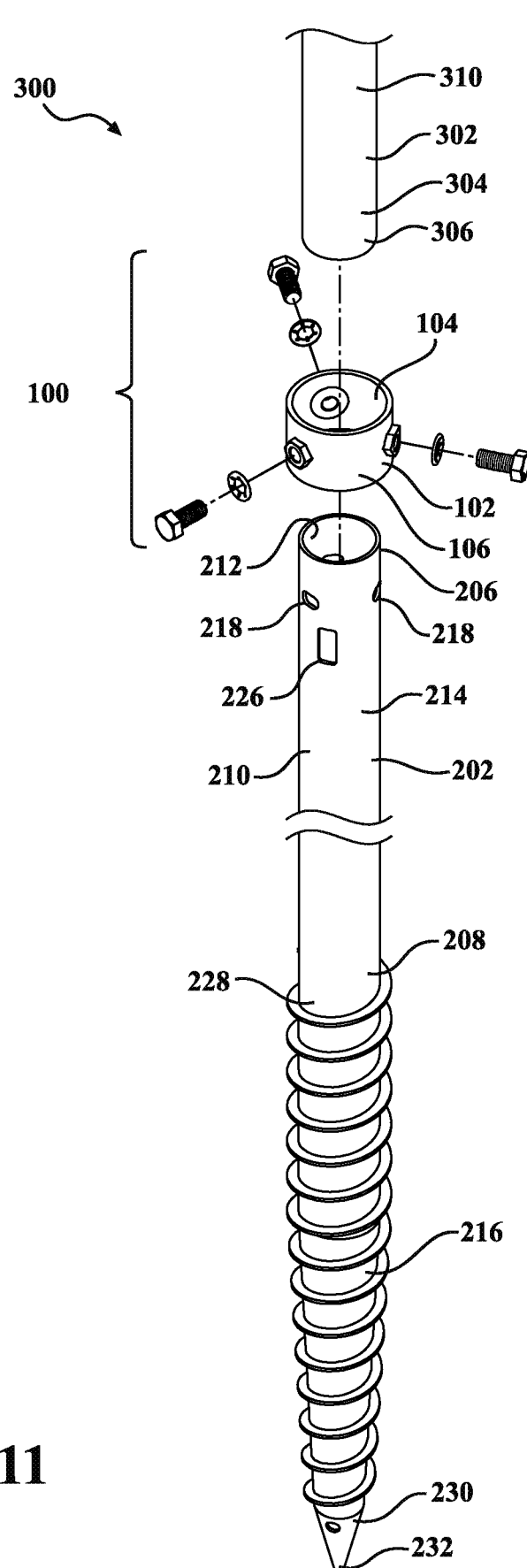
FIG. 11 is an exploded view of the multipart ground screw collar device assembly.

As shown in FIG. 10, the ground screw device 202 may include different threaded portions 216' for varying soil types. As a non-limiting example, such soil types may include soft or sandy soils, shallow bedrock, or high-water tables. As a non-limiting example, the threaded portion 216 may include a helical tip, a rock tip, or an Earth-wedge™. Each threaded portion 216 may include a single pointed tip 232 or may include a plurality of pointed tips 232 as well, depending on the type of ground screw device 202.

Additionally, one of ordinary skill in the art may select suitable ground screw devices 202 of various lengths for those different soil types or for different solar racking systems. As a non-limiting example, the ground screw device 202 may be forty-seven inches (47"), seventy-three inches (73"), or one-hundred-and-twenty-six inches (126") in length, which may be defined by the length of the ground screw device 202 from the pointed tip 232 to the top end 206 of the ground screw device 202. Advantageously, ground screw devices 202 are ideal for soils that contain glacial till, cobble, and hardpan.

As shown in FIGS. 1-13, the collar device 100 may be disposed over the top end 206 of the ground screw device 202 and may be oriented so that the at least one aperture 108 of the collar device 100 may be aligned with the at least one hole 218 of the ground screw device 202. The ground screw device 202 may include a maximum ground screw outer diameter (D3). The maximum ground screw outer diameter (D3) may be defined as the largest outer diameter of the elongate main body 204 along a length of the top end 206 of the ground screw device 202. The maximum ground screw outer diameter (D3) may be less than the minimum collar device inner diameter (D1) to allow the collar device 100 to be disposed over the ground screw outer surface 210 of ground screw device 202 for fastening of the collar device 100 to the ground screw device 202, as shown in FIG. 12. One of ordinary skill in the art may select suitable dimensions for the minimum collar device inner diameter (D1) and the maximum ground screw outer diameter (D3) within the scope of the present disclosure.

With continued reference to FIGS. 1-11, the washer portion 124 of the hexnut washer 120 of the at least one fastener assembly 110 may also be disposed between the collar device inner surface 104 and the ground screw outer surface 210. The threaded post 116 of the fastener 112 may be disposed through each of the at least one aperture 108 of the collar device 100, the locking washer 118, the hexnut washer 120 of the at least one fastener assembly 110, and the at least one hole 218 of the ground screw device 202. Desirably, the separate attachment of the collar device 100 to the ground screw device 202 provides an easy and time efficient way to install and/or remove the collar device 100 from the ground screw device 202 without damaging the ground screw device 202 as part of an on-site installation of the ground screw device 202.

FIGS. 9-11 and 14-17, illustrate an installed racking system 300 including a racking device 302, a ground screw device 202, and a collar device 100, according to an embodiment of the present disclosure. The racking device 302 may include a support leg 304 with a lower end 306, an upper end 308, a support leg outer surface 310, and a support leg inner surface 312. The lower end 306 of the racking device 302 may be disposed within each of the collar device 100 and the ground screw device 202. The support leg 304 may be affixed with the collar device 100 and the ground screw device 202 by an impinging of the at least one fastener assembly 110 against the support leg outer surface 310, as specifically shown in FIG. 17.

Figure 9:
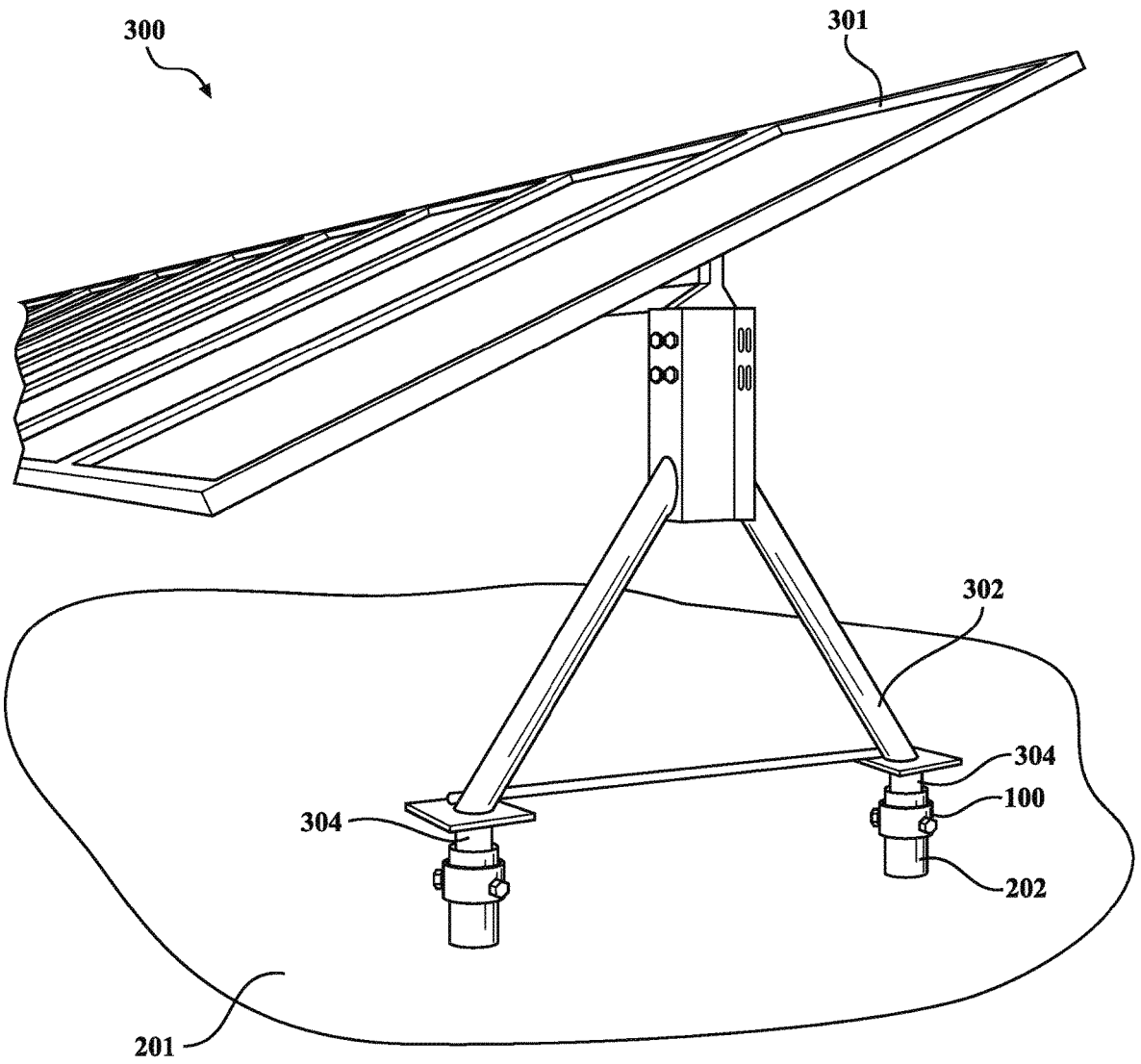
FIG. 9 is an environmental view of the multipart ground screw collar device assembled.

Additionally, the racking device 302 may support at least one solar panel 301, as shown in FIG. 9. In a certain embodiment, the installed racking system 300 may also include a plurality of ground screw devices 202, a plurality of collar devices 100, and a plurality of racking devices 302. Additionally, the plurality of racking devices 302 may include a plurality of support legs 304 whereby each of the plurality of support legs 304 may be disposed within each of the plurality of collar devices 100 and the plurality of ground screw devices 202. One of ordinary skill may select a suitable configuration for the installed racking system 300 within the scope of the present disclosure.

FIG. 29 is a flowchart that describes an installation method 400, according to an embodiment of the present disclosure. At a first step 402, the installation method 400 may include providing a ground screw device 202 as described herein. At a second step 404, the installation method 400 may include providing a collar device 100 as described herein. At a third step 406, the installation method 400 may include providing a racking device 302 as described herein. At a fourth step 408, the installation method 400 may include driving the ground screw device 202 into a ground surface 201. At a fifth step 410, the installation method 400 may include disposing the collar device 100 over the top end 206 of the ground screw device 202. At a sixth step 412, the installation method 400 may include orienting the collar device 100 so that the at least one aperture 108 of the collar device 100 may be aligned with the at least one hole 218 of the ground screw device 202. At a seventh step 414, the installation method 400 may include disposing the washer portion 124 of the hexnut washer 120 of the at least one fastener assembly 110 between the collar device inner surface 104 and the ground screw outer surface 210. At an eighth step 416, the installation method 400 may include disposing the threaded post 116 of the fastener 112 through each of the at least one aperture 108 of the collar device 100, the locking washer 118, the hexnut washer 120 of the at least one fastener assembly 110, and the at least one hole 218 of the ground screw device 202. At a ninth step 418, the installation method 400 may include disposing the lower end 306 of the support leg 304 of the racking device 302 within each of the collar device 100 and the ground screw device 202. At a tenth step 420, the installation method 400 may include affixing the support leg 304 with the collar device 100 and the ground screw device 202 by an impinging of the at least one fastener assembly 110 against the support leg outer surface 310. An installed racking system 300 is thereby provided by the installation method 400.

FIG. 30 is a flowchart that further describes a series of steps 420-436 that involve the installation device 234 and the drive key 236, in a driving process 407 associated with the installation method 400 in FIG. 29. In particular, the driving process 407 involves a power-assisted driving of the ground screw device 202 into the ground surface 201 through use of the installation device 234 and the drive key 236. The driving process 407 can optionally occur between the third step 406 and the fourth step 408 of the installation method 400 shown in FIG. 29, according to one embodiment of the present disclosure.

In the driving process 407 shown in FIG. 30, at an eleventh step 422, the installation method 400 may include a step of providing an installation device 234 and a drive key 236, as further described herein. At a twelfth step 424, the installation method 400 may include providing a prime mover 250. At a thirteenth step 426, the installation method 400 may include disposing the ground screw device 202 adjacent the ground surface 201. At a fourteenth step 428, the installation method 400 may include disposing the open end 240 of the installation device 234 over the top end 206 of the ground screw device 202 and aligning the drive pin recess 246 of the installation device 234 with the drive pin aperture 226 of the ground screw device 202. At a fifteenth step 430, the installation method 400 may include inserting the drive key 236 through each of the slot 244 and the drive pin recess 246 of the installation device 234 and the drive pin aperture 226 of the ground screw device 202. At a sixteenth step 432, the installation method 400 may include disposing the prime mover 250 over the closed end 242 of the installation device 234. At a seventeenth step 434, the installation method 400 may include coupling the prime mover 250 to the closed end 242 of the installation device 234 and drilling the ground screw device 202 into the ground surface 201. At an eighteenth step 436, the installation method 400 may include removing the prime mover 250 from the closed end 242 of the installation device 234. Further, at a nineteenth step 438, the installation method 400 may include removing the installation device 234 and the drive key 236 from the top end 206 of the ground screw device 202. An installed ground screw device 202 is thereby provided by the driving process 407.

Advantageously, the collar device 100 is easy to transport to an on-site location for installation as part of a multi-part ground screw assembly. The collar device 100 is pre-galvanized to provide extra strength against deterioration of the collar device 100 in outdoor conditions. Desirably, the ground screw device 202 is also galvanized independently from the collar device 100 to provide a sturdy ground screw device 202 and militate against deterioration of the material due to outdoor conditions as well. The separate attachment of the collar device 100 to the ground screw device 202 provides an easy and time efficient way to install and further remove the collar device 100 from the ground screw device 202 without damaging the ground screw device 202. Further advantageously, the installation device 234 and the drive key 236 allow the installer to easily drive the ground screw device 202 into the ground surface 201 and simultaneously militating against damage of the ground screw device 202 into rocky soils. Importantly, the ground screw device 202 and the collar device 100 are easily installed with a racking device 302 to provide a solar panel system.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms, and that neither should be construed to limit the scope of the disclosure. In some example embodiments, well-known processes, well-known device structures, and well-known technologies are not described in detail. Equivalent changes, modifications and variations of some embodiments, materials, compositions and methods can be made within the scope of the present technology, with substantially similar results.

What is claimed is:

1. A collar device for a multi-part ground screw, comprising:

an annular main body having a collar device inner surface and a collar device outer surface with at least one aperture formed through the annular main body from the collar device inner surface to the collar device outer surface, the at least one aperture having a hexagon shape; and at least one fastener assembly, including a fastener having a head and a threaded post, a locking washer, and a hexnut washer having a nut portion with a hexagon shape and a washer portion, the locking washer disposed on the threaded post of the fastener between the head of the fastener and the collar device outer surface, and the hexnut washer disposed in the at least one aperture, the nut portion of the hexnut washer having an interference fit with the at least one aperture, and the washer portion of the hexnut washer disposed adjacent the collar device inner surface.

2. The collar device of claim 1, wherein the at least one aperture of the annular main body includes a plurality of apertures, and the at least one fastener assembly includes a plurality of fastener assemblies.

3. The collar device of claim 2, wherein the plurality of apertures is substantially evenly spaced apart around the annular main body.

4. The collar device of claim 3, wherein the plurality of apertures is substantially centrally disposed on the annular main body.

5. A multi-part ground screw assembly, comprising:

a ground screw device including an elongate main body having a top end, a bottom end, a ground screw outer surface, a ground screw inner surface, a non-threaded portion, and a threaded portion, the non-threaded portion disposed adjacent the top end of the elongate main body, the non-threaded portion having at least one hole formed through the non-threaded portion of the elongate main body from the ground screw outer surface to the ground screw inner surface, and the threaded portion disposed adjacent the bottom end of the elongate main body; and a collar device including an annular main body having an collar device inner surface and an collar device outer surface with at least one aperture formed through the annular main body from the collar device inner surface to the collar device outer surface, the at least one aperture having a hexagon shape, and an at least one fastener assembly, including a fastener having a head and a threaded post, a locking washer, and a hexnut washer having a nut portion with a hexagon shape and a washer portion, the locking washer disposed on the threaded post of the fastener between the head of the fastener and the collar device outer surface, and the hexnut washer disposed in the at least one aperture, the nut portion of the hexnut washer having an interference fit with the at least one aperture, and the washer portion of the hexnut washer disposed adjacent the collar device inner surface, and the collar device is disposed over the top end of the ground screw device, and the collar device is oriented so that the at least one aperture of the collar device is aligned with the at least one hole of the ground screw device, the washer portion of the hexnut washer of the at least one fastener assembly disposed between the collar device inner surface and the ground screw outer surface, and the threaded post of the fastener disposed through each of the at least one aperture of the collar device, the locking washer, the hexnut washer of the at least one fastener assembly, and the at least one hole of the ground screw device.

6. The multi-part ground screw assembly of claim 5, wherein the at least one hole of the ground screw device is elongate and has a maximum length and a maximum height, and the threaded post has a maximum diameter, and the maximum height of the at least one hole is less than the maximum diameter of the threaded post of the fastener prior to a disposing of the at least one fastener assembly into the ground screw device.

7. The multi-part ground screw assembly of claim 6, wherein the at least one hole of the ground screw device includes a top edge and a bottom edge defining the maximum height of the at least one hole.

8. The multi-part ground screw assembly of claim 7, wherein a material adjacent the top edge and the bottom edge of the at least one hole is displaced upon disposing of the at least one fastener assembly into the at least one hole of the ground screw device.

9. The multi-part ground screw assembly of claim 5, wherein the elongate main body of the ground screw device is unitary.

10. The multi-part ground screw assembly of claim 5, wherein the elongate main body of the ground screw device is multipiece, and the threaded portion of the elongate main body is formed as a first piece and the non-threaded portion of the elongate main body is formed as a second piece, the first piece and the second piece selectively coupled together with at least one fastener.

11. The multi-part ground screw assembly of claim 5, wherein the ground screw device further includes a drive pin aperture, the drive pin aperture formed through the non-threaded portion of the elongate main body of the ground screw device from the ground screw outer surface to the ground screw inner surface.

12. The multi-part ground screw assembly of claim 11, wherein the drive pin aperture is substantially spaced apart both axially and laterally from the at least one hole in the elongate main body of the ground screw device.

13. The multi-part ground screw assembly of claim 12, wherein the drive pin aperture is configured to selectively receive a drive key.

14. An installed system, comprising:

a ground screw device including an elongate main body having a top end, a bottom end, a ground screw outer surface, a ground screw inner surface, a non-threaded portion, and a threaded portion, the non-threaded portion disposed adjacent the top end of the elongate main body, the non-threaded portion having at least one hole formed through the non-threaded portion of the elongate main body from the ground screw outer surface to the ground screw inner surface, and the threaded portion disposed adjacent the bottom end of the elongate main body;

a collar device including an annular main body having an collar device inner surface and an collar device outer surface with at least one aperture formed through the annular main body from the collar device inner surface to the collar device outer surface, the at least one aperture having a hexagon shape, and an at least one fastener assembly, including a fastener having a head and a threaded post, a locking washer, and a hexnut washer having a nut portion with a hexagon shape and a washer portion, the locking washer disposed on the threaded post of the fastener between the head of the fastener and the collar device outer surface, and the hexnut washer disposed in the at least one aperture, the nut portion of the hexnut washer having an interference fit with the at least one aperture, and the washer portion of the hexnut washer disposed adjacent the collar device inner surface, and the collar device is disposed over the top end of the ground screw device, and the collar device is oriented so that the at least one aperture of the collar device is aligned with the at least one hole of the ground screw device, the washer portion of the hexnut washer of the at least one fastener assembly disposed between the collar device inner surface and the ground screw outer surface, and the threaded post of the fastener disposed through each of the at least one aperture of the collar device, the locking washer, the hexnut washer of the at least one fastener assembly, and the at least one hole of the ground screw device; and a racking device having a support leg with a lower end, an upper end, a support leg outer surface, and a support leg inner surface, the lower end of the racking device disposed within each of the collar device and the ground screw device, the support leg affixed with the collar device and the ground screw device by an impinging of the at least one fastener assembly against the support leg outer surface.

15. The installed system of claim 14, wherein the racking device supports at least one solar panel.

16. The installed system of claim 14, wherein the installed system further includes a plurality of ground screw devices, a plurality of collar devices, and a plurality of racking devices.

17. The installed system of claim 16, wherein the racking device includes a plurality of support legs configured to be disposed within each of the plurality of collar devices and the plurality of ground screw devices.

18. An installation method, comprising steps of:

providing a ground screw device including an elongate main body having a top end, a bottom end, a ground screw outer surface, a ground screw inner surface, a non-threaded portion, and a threaded portion, the non-threaded portion disposed adjacent the top end of the elongate main body, the non-threaded portion having at least one hole formed through the non-threaded portion of the elongate main body from the ground screw outer surface to the ground screw inner surface, and the threaded portion disposed adjacent the bottom end of the elongate main body;

providing a collar device including an annular main body having an collar device inner surface and an collar device outer surface with at least one aperture formed through the annular main body from the collar device inner surface to the collar device outer surface, the at least one aperture having a hexagon shape, and an at least one fastener assembly, including a fastener having a head and a threaded post, a locking washer, and a hexnut washer having a nut portion with a hexagon shape and a washer portion, the locking washer disposed on the threaded post of the fastener between the head of the fastener and the collar device outer surface, and the hexnut washer disposed in the at least one aperture, the nut portion of the hexnut washer having an interference fit with the at least one aperture, and the washer portion of the hexnut washer disposed adjacent the collar device inner surface; and providing a racking device having a support leg with a lower end, an upper end, a support leg outer surface, and a support leg inner surface;

driving the ground screw device into a ground surface;

disposing the collar device over the top end of the ground screw device;

orienting the collar device so that the at least one aperture of the collar device is aligned with the at least one hole of the ground screw device;

disposing the washer portion of the hexnut washer of the at least one fastener assembly between the collar device inner surface and the ground screw outer surface;

disposing the threaded post of the fastener through each of the at least one aperture of the collar device, the locking washer, the hexnut washer of the at least one fastener assembly, and the at least one hole of the ground screw device;

disposing the lower end of the support leg of the racking device within each of the collar device and the ground screw device; and affixing the support leg with the collar device and the ground screw device by an impinging of the at least one fastener assembly against the support leg outer surface, whereby an installed system is provided.

19. The installation method of claim 18, further comprising steps of:

providing an installation device having a tubular main body with an open end, a closed end, and a slot with a drive pin recess, the slot and the drive pin recess disposed between the open end and the closed end of the installation device, the drive pin recess centrally disposed adjacent the slot, the installation device configured to be selectively removably disposed over the top end of the ground screw device; and providing a drive key having a tapered main body, the drive key configured to be disposed through each of the slot and the drive pin recess of the installation device.

20. The installation method of claim 19, wherein the step of driving the ground screw device into the ground surface includes steps of:

providing a prime mover;

disposing the ground screw device adjacent the ground surface;

disposing the open end of the installation device over the top end of the ground screw device and aligning the drive pin recess of the installation device with a drive pin aperture of the ground screw device;

inserting the drive key through each of the slot and the drive pin recess of the installation device and the drive pin aperture of the ground screw device;

disposing the prime mover over the closed end of the installation device;

coupling the prime mover to the closed end of the installation device and drilling the ground screw device into the ground surface;

removing the prime mover from the closed end of the installation device; and removing the installation device and the drive key from the top end of the ground screw device.

\* \* \* \* \*